United States Patent [19]
Yoshida et al.

[11] Patent Number: 6,114,799
[45] Date of Patent: Sep. 5, 2000

[54] DRIVING MECHANISM

[75] Inventors: Ryuichi Yoshida, Sagamihara; Yasuhiro Okamoto, Tondabayashi, both of Japan

[73] Assignee: Minolta Co., Ltd., Osaka, Japan

[21] Appl. No.: 09/020,944

[22] Filed: Feb. 9, 1998

[30] Foreign Application Priority Data

| Feb. 10, 1997 | [JP] | Japan | 9-026425 |
| Feb. 10, 1997 | [JP] | Japan | 9-026427 |

[51] Int. Cl.⁷ .................................................. H02N 2/00
[52] U.S. Cl. ...................................... 310/328; 310/323.17
[58] Field of Search .................................. 310/323, 328, 310/323.01, 323.02, 323.17

[56] References Cited

U.S. PATENT DOCUMENTS

| 4,195,243 | 3/1980 | Thaxter | 310/317 |
| 4,672,256 | 6/1987 | Okuno et al. | 310/323 |
| 4,947,077 | 8/1990 | Murata | 310/328 |
| 4,968,914 | 11/1990 | West et al. | 310/328 |
| 5,013,958 | 5/1991 | Ohnishi et al. | 310/323 |
| 5,087,851 | 2/1992 | Nakazawa et al. | 310/323 |
| 5,134,334 | 7/1992 | Onishi et al. | 310/323 |
| 5,225,941 | 7/1993 | Saito et al. | 359/824 |
| 5,260,622 | 11/1993 | West | 310/328 |
| 5,453,653 | 9/1995 | Zumeris | 310/323 |
| 5,818,147 | 10/1998 | Kobayashi et al. | 310/323 |

FOREIGN PATENT DOCUMENTS

| 55-100059 | 7/1980 | Japan | 310/328 |
| 231176 | 11/1985 | Japan | 310/328 |
| 6-197560 | 7/1994 | Japan | 310/328 |

*Primary Examiner*—Thomas M. Dougherty
*Attorney, Agent, or Firm*—Burns, Doane, Swecker & Mathis, LLP

[57] ABSTRACT

A driving device with a long stroke and high speed driving ability. The device includes a base with a pair of parallel guides which are elastically installed thereon, and includes a drive unit in which there are arranged in series a driving member frictionally engaging the guides, a piezoelectric element for actuating the driving member in a direction in which the piezoelectric element expands and contracts, and a movable member, with a mass larger than the driving member, on which the driving member and the piezoelectric element are installed movably in the direction. When the piezoelectric element expands slowly with a pulse voltage applied thereto, the movable member moves with the driving member remaining stationary, relative to the guide. When the piezoelectric element contracts rapidly, the driving member slides relative to the guide with the movable member remaining stationary relative thereto. Thus, the drive unit is driven and moved along the guide.

25 Claims, 12 Drawing Sheets

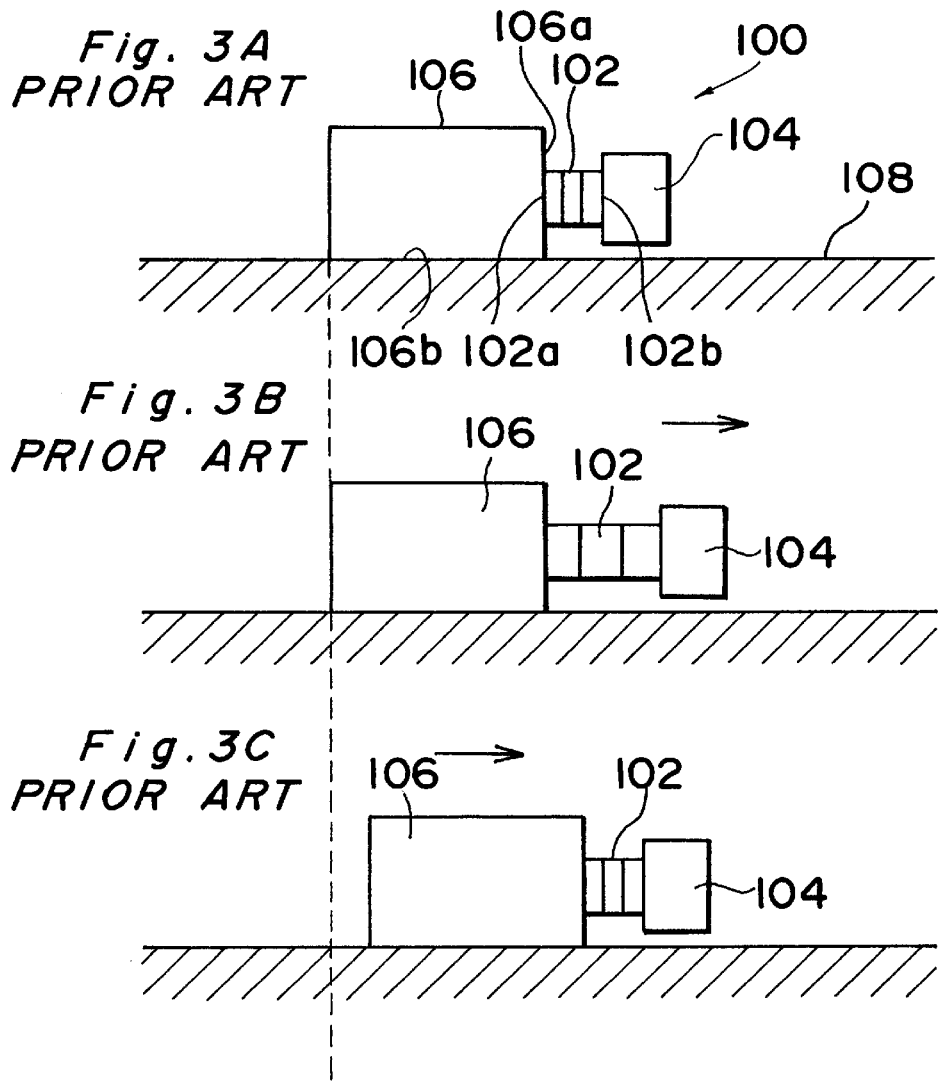
Fig. 3A PRIOR ART
Fig. 3B PRIOR ART
Fig. 3C PRIOR ART
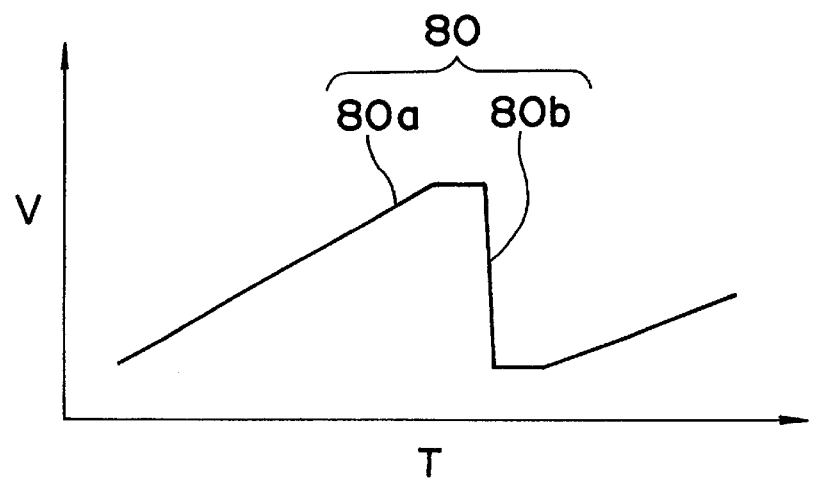
Fig. 3D PRIOR ART

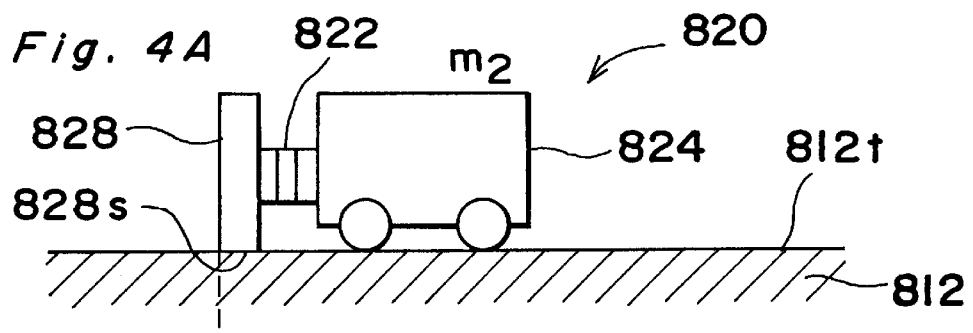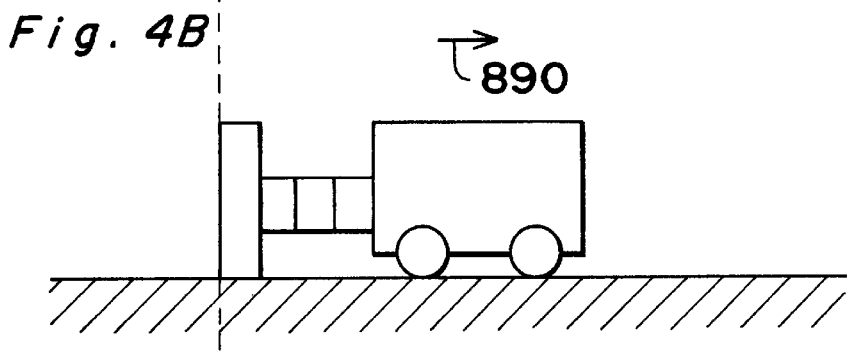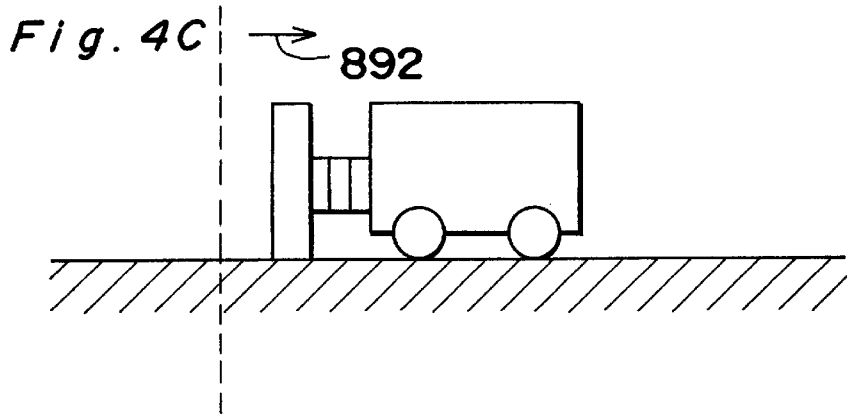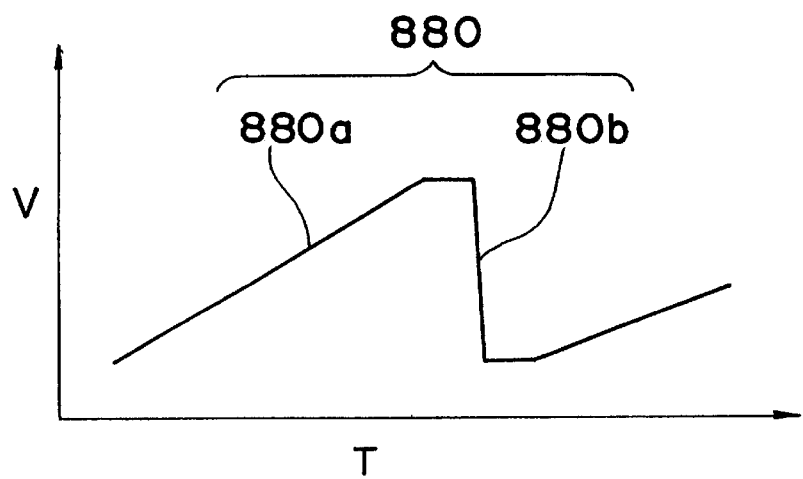

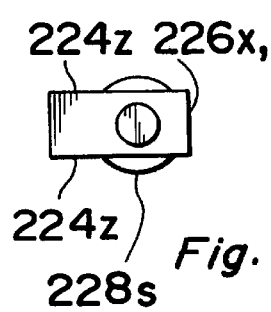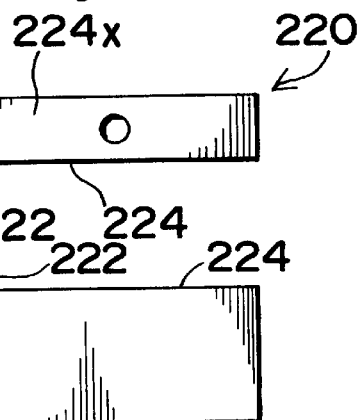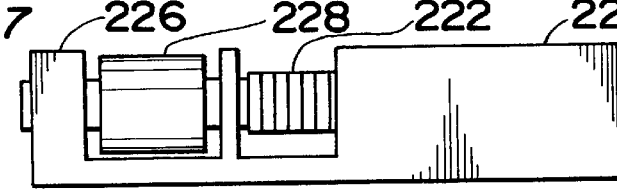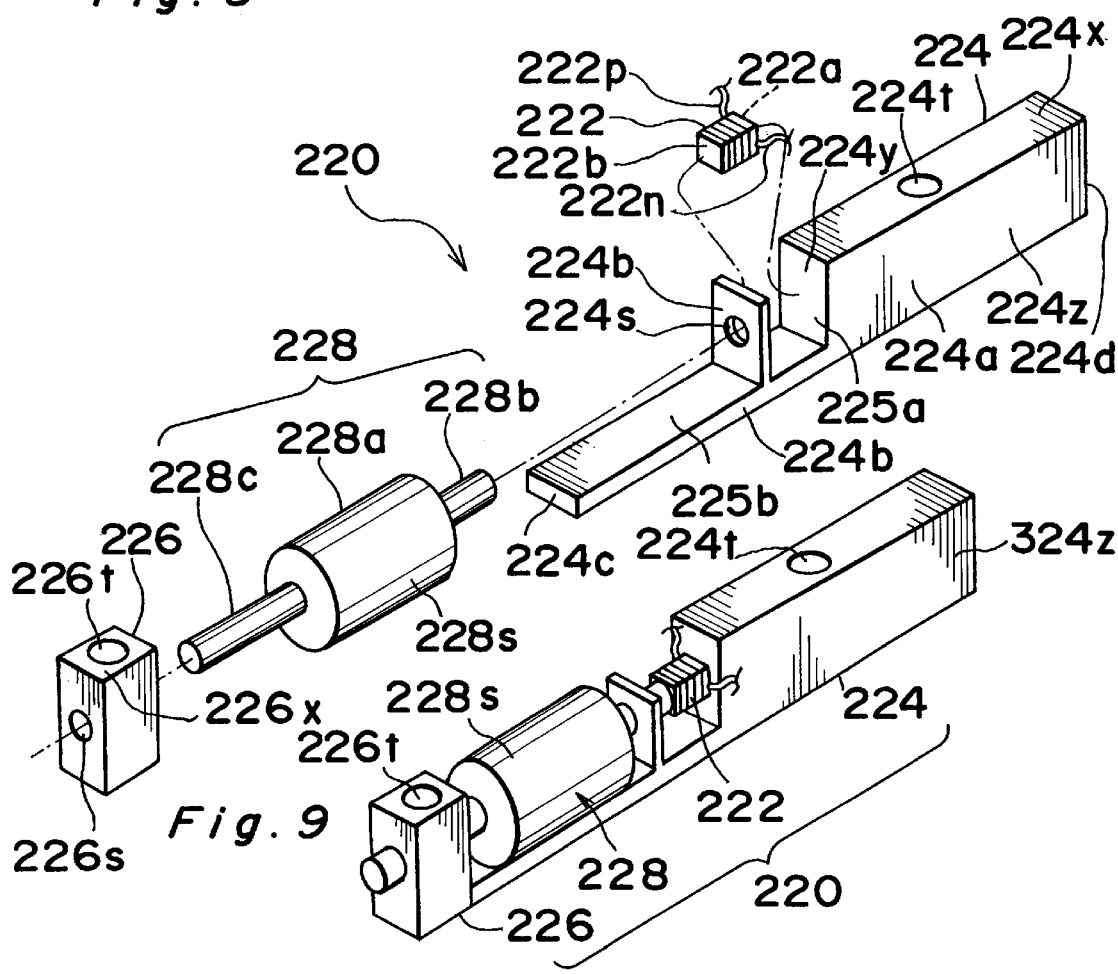

DRIVING MECHANISM

This application is based on application Ser. Nos. 9-26425 and 9-26427 filed in Japan, the contents of which are hereby incorporated by reference.

BACKGROUND OF THE INVENTION

1. Field of the Invention

The present invention generally relates to a driving mechanism, and particularly relates to the driving mechanism using an electromechanical transducer, such as a piezoelectric element, for driving a movable object, the driving mechanism being preferably used for accurately driving an X-Y driving table, a photographing lens of a camera, a probe of a scanning type of tunneling electron microscope, and so on.

2. Description of the Related Arts

Conventionally, there has been proposed a driving mechanism which achieves a high resolution on sub-$\mu$m order by using a piezoelectric linear actuator, instead of using a stepping motor.

For example, a driving mechanism 110 the main part of which is shown in an exploded perspective view of FIG. 1 and in an assembling perspective view of FIG. 2, comprises a fixing member 124 which is fixed to an unshown base, a piezoelectric element 122, a driving shaft 126 which is slidably supported by the fixing member 124, and a driving unit 128 which is coupled to an unshown member to be driven such as a stage or the like on which some other parts are mounted.

The piezoelectric element 122 is a kind of electromechanical transduction element or electromechanical transducer, and changes in length when a voltage is applied thereto. One end face 122a in a direction of expansion and contraction of the piezoelectric element 122 is fixed to the fixing member 124, and the other end face 122b in the direction thereof of the piezoelectric element 122 is fixed to one end 126a of the driving shaft 126. The driving unit 128 frictionally engages the driving shaft 126.

According to this driving mechanism 110, when some voltage in a saw-toothed wave form of a periodic pulse, for example, is applied to the piezoelectric element 122, the driving shaft 126 is reciprocated in the axial direction thereof, causing the driving unit 128 to be moved along the driving shaft 126.

In respect of such a driving mechanism 110, a longer driving shaft 126 is required in order to widen a movable range of the member to be driven, namely, in order to realize a longer stroke of the driving unit 128.

However, if the driving shaft 126 is longer, the mass of the driving shaft 126 increases, thus the responsivity of the piezoelectric element 122 deteriorating. As a result, the driving shaft 126 can not be driven at high frequencies, and this incurs a slowdown in moving speed of the member to be driven. Namely, with the mechanism, it is difficult to realize a longer stroke of the member to be driven while the moving speed of the member to be driven is maintained unchanged.

On the other hand, there has been proposed a stage using displacement of the piezoelectric element itself. However, with such a stage, it was difficult to realize enough displacement.

On the other hand, there has been proposed a driving mechanism which realizes a very high resolution and a long stroke with a self-moving piezoelectric linear actuator, namely, with an impact type of actuator, as shown in the schematic diagrams of FIGS. 3A to 3D.

More specifically, this driving mechanism 100 is constructed as follows. As shown in FIGS. 3A to 3C, one end face 106a of a movable member 106 which is coupled to an unshown member such as a stage to be driven, is fixed to one end in a direction of expansion and contraction of a piezoelectric member 102. The other end in the direction thereof of the piezoelectric member 102 is fixed to a member of inertia 104. The movable member 106 is placed on a support surface 108. A bottom surface 106b of the movable member 106 frictionally engages the support surface 108, causing a frictional force to be generated therebetween.

This driving mechanism 100 is operated as follows. That is, when some voltage in a saw-toothed wave form of a periodic pulse, for instance, as shown in FIG. 3D is applied to the piezoelectric element 102, the piezoelectric element 102 slowly expands and the member of inertia 104 moves from the state shown in FIG. 3A to the state shown in FIG. 3B. Next, the piezoelectric element 102 rapidly contracts or shrinks so that the movable member 106 is moved from the state shown in FIG. 3B to the state shown in FIG. 3C by an impact of the member of inertia 104. Along with this movement of the movable member 106, the member to be driven by the movable member 106 is also driven and moved.

According to the driving mechanism 100, the movable member 106 moves on the support surface 108. Therefore, by lengthening the support surface 108, the stroke of the member to be driven can be lengthened to any extent, theoretically.

However, in this driving mechanism 100, if the member of inertia 104 is made heavier for the purpose of realizing increasing speed thereof with a greater impact, the responsivity of the piezoelectric element 102 becomes worse, thus resulting in a lower speed thereof to the contrary. Meanwhile, if the member of inertia 104 is made lighter for the purpose of realizing increased responsivity of the piezoelectric element 102, the impact becomes smaller, thus resulting in a lower speed thereof as well.

That is, it is a difficult matter to determine the mass of the member of inertia 104, and there is a limitation in achieving higher speed thereof with this type of driving mechanism 100 using the impact actuator.

Also, this driving mechanism 100 is so constructed that the movable member 106 and the member to be driven are guided separately and independently of each other. As a result, there arises a problem that the member to be driven can not be driven with a sufficient parallelism between the driving direction of the movable member 106 and the guiding direction in which the member to be driven thereby is guided.

SUMMARY OF THE INVENTION

Therefore, it is an object of the present invention to provide a driving mechanism by which a long stroke of the member to be driven and a high-speed driving thereof are realized.

It is another object of the present invention to provide the driving mechanism in which the member to be driven can be driven even if there is not enough parallelism between the driving direction of the movable member and the guiding direction in which the member to be driven thereby is guided.

In carrying out the present invention in one preferred mode, there is provided a driving mechanism comprising: an electromechanical transducer which expands and contracts in a predetermined direction; a movable member which is connected to one of a pair of ends in the direction of the electromechanical transducer; a frictional member which is connected to the other of the pair of ends in the direction thereof; a base; and a guide which is provided on the base, wherein the guide frictionally engages the frictional member, and wherein the guide guides the frictional member in the direction.

In the above mechanism, the electromechanical transducer can be a piezoelectric element, for example; the electromechanical transducer, for example, can be actuated by a circuit (or pulse generating circuit) for generating a driving pulse supplied thereto; and there can be provided a member or apparatus, to be driven, on the movable member. The movable member and the guide are so constructed that the movable member does not frictionally engage the guide.

According to the mechanism, when the electromechanical transducer is expanded and contracted with a predetermined pattern by the driving pulse supplied thereto, the frictional member slides and moves along the guide, with a frictional force exerting between the frictional member and the guide, and with a relation between an inertia of the frictional member and an inertia of the movable member, so that the movable member, and the member or the apparatus to be driven by the movable member, are moved along the guide.

In the mechanism, it is preferable that the frictional member has a mass smaller than a mass of the movable member.

Referring to FIGS. 4A through 4D, a principle of how the driving mechanism works is explained below.

For example, when a voltage in the saw-toothed wave form of a periodic pulse 880 as shown in FIG. 4D is supplied to an electromechanical transducer 822 of the driving unit 820 from the pulse generating circuit, and when the voltage slowly goes up as shown by a reference numeral 880a in the figure, the electromechanical transducer 822 slowly expands as shown in FIGS. 4A and 4B. At this time, the electromechanical transducer 822 slowly expands; therefore, its acceleration is small. Namely, the frictional force exerting between a contacting surface 828s of the frictional member 828, and a contacting surface 812t of the guide 812, is larger than the force of inertia of the movable member 824. Therefore, the frictional member 828 does not slide relative to the guide 812, and remains stationary relative thereto.

On the other hand, as the electromechanical transducer 822 slowly expands, the movable member 824 is moved in a direction in which the movable member 824 is away from the frictional member 828, as shown by an arrow 890 in FIG. 4B.

Next, when the pulse voltage suddenly falls down as shown by a reference numeral 880b in FIG. 4D, the electromechanical transducer 822 suddenly contracts or shrinks. At this time, because the electromechanical transducer 822 suddenly shrinks, its acceleration is large. Therefore, the force of inertia of the movable member 824 is larger than the frictional force exerting between the frictional member 828 and the guide 812. Also, because the movable member 824 has a larger mass than the mass of the frictional member 828, the movable member 824 actually does not move relative to the guide 812. On the other hand, the frictional member 828 slides relative to the guide 812 so that the frictional member 828 approaches the movable member 824, as shown by an arrow 892 in FIG. 4C.

With this mechanism, the frictional member moves along the guide. Namely, by constructing the driving mechanism so that the guide is longer, it possible to lengthen a stroke of the movable member relative to the base. Also, even if the guide is made longer, a driving unit which is constituted by the electromechanical transducer, the movable member and the frictional member, does not slow down in speed relative to the guide or the base. Also, because the mass of the frictional member is smaller than the mass of the movable member, it is possible to drive the driving unit at higher speed relative to the base.

FIG. 18 shows an experimental result of a relation between a driving frequency and a driving speed of the driving unit relative to the base. In the figure, a case in which a mass of a frictional connecting part thereof is sufficiently small as what is illustrated in FIG. 4A, is shown by (a), while a case in which a mass of a frictional connecting part thereof is sufficiently large as what is illustrated in FIG. 3A, is shown by (b).

According to the experimental result, in case that the mass of the frictional connecting part thereof is sufficiently small, a peak value in the driving speed comes at a location which corresponds to a higher driving frequency. This means that the driving speed is higher.

Meanwhile, in case that the mass of the frictional connecting part thereof is sufficiently large, a peak value in the driving speed comes at a location which corresponds to a lower driving frequency. This means that the driving speed is lower.

Namely, the smaller the mass of the frictional connecting part thereof, it is possible to actuate the driving mechanism with higher driving frequencies, and to make the driving speed higher. Accordingly, there is provided the driving mechanism possible to realize a longer stroke and a higher driving of the driving unit, relative to the guide.

Preferably, the guide comprises a first member and a second member, and wherein the frictional member is held between the first member and the second member.

According to the mechanism, there arises a frictional force between the frictional member and the guide by holding the frictional member between the pair of members. Therefore, even if the mass of the frictional member is smaller, a desired frictional force can be exerted therebetween. Accordingly, with the mechanism, it is possible to make the frictional member lighter, to enhance the driving efficiency, and to realize a higher driving of the driving unit relative to the guide.

Also, according to the mechanism, the driving unit is mounted between the first and second members. Therefore, a space used for the arrangement of the driving unit and the pair of members, can be optimized, thus possible to make the driving mechanism compact.

Preferably, the first member is fixed to the base, wherein the second member is positioned along the first member, and wherein the second member is movably supported relative to the first member with the second member being prevented from moving in the direction.

According to the mechanism, because the second member is prevented from moving in the direction in which the electromechanical transducer expands and contracts while the movable member moves along the first member, the driving unit is prevented from shaking in the same direction.

Preferably, there is further provided a biasing device which biases the second member towards the first member, and the biasing device may comprise a biasing member which contacts a surface, of the second member, opposite a surface with which the frictional member engages.

More specifically, the biasing member can be supported by the movable member, wherein the biasing member biases the second member towards the first member at a location corresponding to the frictional member.

According to the mechanism, no matter where the frictional member is positioned relative to the first and second member, the biasing member biases the second member towards the first member at the location which corresponds to the frictional member. Therefore, a generally constant frictional force is exerted between the frictional member and the first and second members, so that a variation in driving speed of the driving unit relative to the guide is minimized.

In the above mechanism, it is preferable that a frictional coefficient between the biasing member and the second member is smaller than a frictional coefficient between the frictional member and the second member.

According to the mechanism, when the electromechanical transducer slowly expands or contracts, there occurs a slide between the biasing member and the second member while there occurs no slide between the second member and the frictional member. Consequently, the movable member, and the member to be driven which is mounted on the movable member, are moved by a distance corresponding to the length by which the electromechanical transducer expands or contracts, thus realizing a drive of the member to be driven with an ability of high resolution.

In the mechanism, it is preferable that the biasing member is constituted by a rotational member which rotatably contacts the second member.

Generally, when a rotational member contacts an object with the rotational member rotating thereon, the frictional coefficient exerting therebetween is small. Consequently, with the mechanism, it is easy to set the frictional coefficient between the second member and the biasing member smaller than the frictional coefficient between the second member and the frictional member.

In the mechanism, it is preferable that there is further provided a spacer for regulating a space between the first member and the second member.

According to the mechanism, because the space between the first member and the second member is kept constant, the pressure exerted upon the frictional member by the first and second members is kept generally constant, no matter where the frictional member is positioned along the first and second members. Consequently, a variation in driving speed of the driving unit relative to the first and second members is minimized, irrespective of the position of the frictional member relative to the first and second members.

Alternatively, each of the first member and the second member may be constituted by a magnetic body in which the first member and the second member attract each other. In the mechanism, it is preferable that the first member and the second member are constructed so that the second member is moved in parallel to the first member.

According to the mechanism, the first member and the second member are attracted to each other by the magnetically attractive force exerting therebetween with a state in which the second member is moved in parallel to the first member. Therefore, the pressure exerted upon the frictional member by the first and second members is kept generally constant. Consequently, a variation in driving speed of the driving unit relative to the first and second members is minimized, irrespective of the position of the frictional member relative to the first and second members.

In the mechanism, it is preferable that the frictional member is made of carbon fiber reinforced complex resin.

With the construction, it is possible to realize that the mass of the frictional member is far smaller than the mass of the movable member so that the driving unit can be driven with a high frequency. Also, because the frictional member made of the carbon fiber reinforced complex resin has a good slidability relative to the guide, the driving speed of the driving unit relative thereto is highly stabilized.

In the mechanism, it is preferable that the movable member comprises a support part for movably supporting the frictional member in the direction.

With the mechanism, the frictional member is prevented from shaking sideways, namely in a direction perpendicular to the direction in which the electromechanical transducer expands and contracts, by the support part. As a result, the driving stability of the frictional member relative to the movable member is enhanced.

In the mechanism, it is preferable that the guide has a surface with which the frictional member engages, and wherein the surface has a roughness Ra smaller than 6 $\mu$m in arithmetic mean.

With the construction, a possible variation in driving speed of the driving unit relative to the guide, depending on a surface roughness Ra of the guide, is minimized. That is, in case that the roughness Ra in arithmetic mean of the surface of the guide is smaller than 6 $\mu$m, the variation thereof can be minimized. However, in case that the roughness Ra in arithmetic mean of the surface of the guide is greater than 6 $\mu$m, the variation gradually increases. Therefore, by making the roughness Ra in arithmetic mean thereof smaller than 6 $\mu$m, it is possible to reduce the variation in driving speed thereof.

In carrying out the present invention in another preferred mode, there is provided a driving mechanism comprising: A driving mechanism, comprising: a drive unit which has an electromechanical transducer which expands and contracts in a first direction, a movable member which is connected to one of a pair of ends in the first direction of the electromechanical transducer, and a frictional drive member which is connected to the other of the pair of ends in the first direction thereof; a base; and a frictional member which is provided on the base and frictionally engages the frictional drive member of the drive unit.

In the mechanism, it is preferable that the frictional member does not move in the first direction, and that the frictional member is supported by the base so as to limit a movement of the frictional drive member in a second direction generally perpendicular to the first direction or that the frictional member is supported by the base so that the frictional member is movable in a second direction generally perpendicular to the first direction.

In the mechanism, for example, there can be further provided: a stage which is fixed to the movable member; and a guide member which is supported by the base and which guides the stage generally in the first direction.

According to the mechanism, the stage is guided by the guide member while the driving unit is guided by the frictional member. With the mechanism, in case that there is not enough parallelism between the direction in which the stage is guided by the guide member and the direction in which the driving unit is guided by the frictional member, the frictional member is followed and displaced by the displacement of the frictional drive member of the driving unit so that the frictional drive member of the driving unit is displaced generally in the second direction. Accordingly, the frictional engaging state between the frictional drive member and the frictional member is kept constant, thus the driving unit with the frictional drive member being driven along the frictional member. Accordingly, there is provided the driving mechanism having the drive unit with a long stroke, in which the driving unit can be driven even if there is not enough parallelism between the direction in which the stage is guided by the guide member and the direction in which the driving unit is guided by the frictional member.

In the mechanism, it is preferable that the frictional drive member engages the frictional member with one of a state in which the frictional drive member contacts the frictional member with a point therebetween, and a state in which the frictional drive member contacts the frictional member with a line therebetween.

Generally, in case that the direction in which the frictional drive member moves is not parallel with the direction in which the stage moves, the frictional drive member undergoes a resistance from a part of the frictional member at a location at which the frictional drive member contacts the frictional member. The resistance can be reduced by a construction in which the frictional drive member and the frictional member contact each other by a point or a line therebetween, because of its small contacting area therebetween.

According to the above mechanism, therefore, the contacting area therebetween is small, and it is possible to effectively avoid any harmful influence which may be brought about in case that the direction in which the frictional drive member moves is not parallel with the direction in which the stage moves.

In the mechanism, it is preferable that the frictional member comprises at least a pair of members each of which can be displaced generally in the second direction, wherein the pair of members hold the frictional drive member of the drive unit so as to exert a frictional force between the frictional drive member and the member.

According to the mechanism, in case that the direction in which the frictional drive member moves is not parallel with the direction in which the stage moves, the frictional member is moved by the frictional drive member generally in the second direction. That is, with such a simple construction, it is possible to make the frictional member follow the movement of the frictional drive member so that the frictional drive member frictionally engages the frictional member.

In the mechanism, it is preferable that the frictional drive member of the drive unit comprises a spherical body and a pair of axial parts which project from both sides of the spherical body, wherein the movable member movably supports the pair of axial parts of the frictional drive member generally in the first direction, and wherein the frictional member comprises a surface with which the spherical body of the frictional drive member contacts.

According to the mechanism, the spherical body of the frictional drive member contacts a pair of the surfaces of the frictional member with a pair of points symmetrical to a centering axis of the frictional drive member. Therefore, a harmful moment for possibly breaking the connection between the electromechanical transducer and the axial part of the frictional drive member to which the electromechanical transducer is connected, is effectively prevented from occurring.

Also, according to the mechanism, the frictional drive member is guided by the movable member. Therefore, a shaking of the frictional drive member sideways is effectively prevented, and it is possible to drive the drive unit having the frictional drive member relative to the frictional member, at a higher driving speed.

BRIEF DESCRIPTION OF THE DRAWINGS

These and other objects and features of the present invention will become clear from the following description taken in conjunction with preferred embodiments thereof with reference to the accompanying drawings, in which:

FIG. 3A is an explanatory view showing how a conventional driving mechanism using an impact actuator works;

FIG. 3B is an explanatory view of the driving mechanism of FIG. 3A;

FIG. 3C is an explanatory view of the driving mechanism of FIG. 3A;

FIG. 3D is a graph showing a voltage in a saw-toothed wave form of a periodic pulse which is applied to the driving mechanism of FIG. 3A;

FIG. 4A is an explanatory view showing a principle of operation of a driving mechanism according to the present invention;

FIG. 4B is an explanatory view showing the principle of operation of the driving mechanism of FIG. 4A;

FIG. 4C is an explanatory view showing the principle of operation of the driving mechanism of FIG. 4A;

FIG. 4D is a graph showing a voltage in a saw-toothed wave form of a periodic pulse which is applied to the driving mechanism of FIG. 4A;

FIG. 5 is a front view of a driving unit of a driving mechanism according to a first embodiment of the present invention;

FIG. 6 is a top view thereof of the driving mechanism of FIG. 5;

FIG. 7 is a side view thereof of the driving mechanism of FIG. 5;

FIG. 8 is an exploded perspective view of the driving unit of FIG. 5;

FIG. 9 is a perspective view of the driving unit assembled of FIG. 8;

DETAILED DESCRIPTION OF THE PREFERRED EMBODIMENTS

Figure 1:
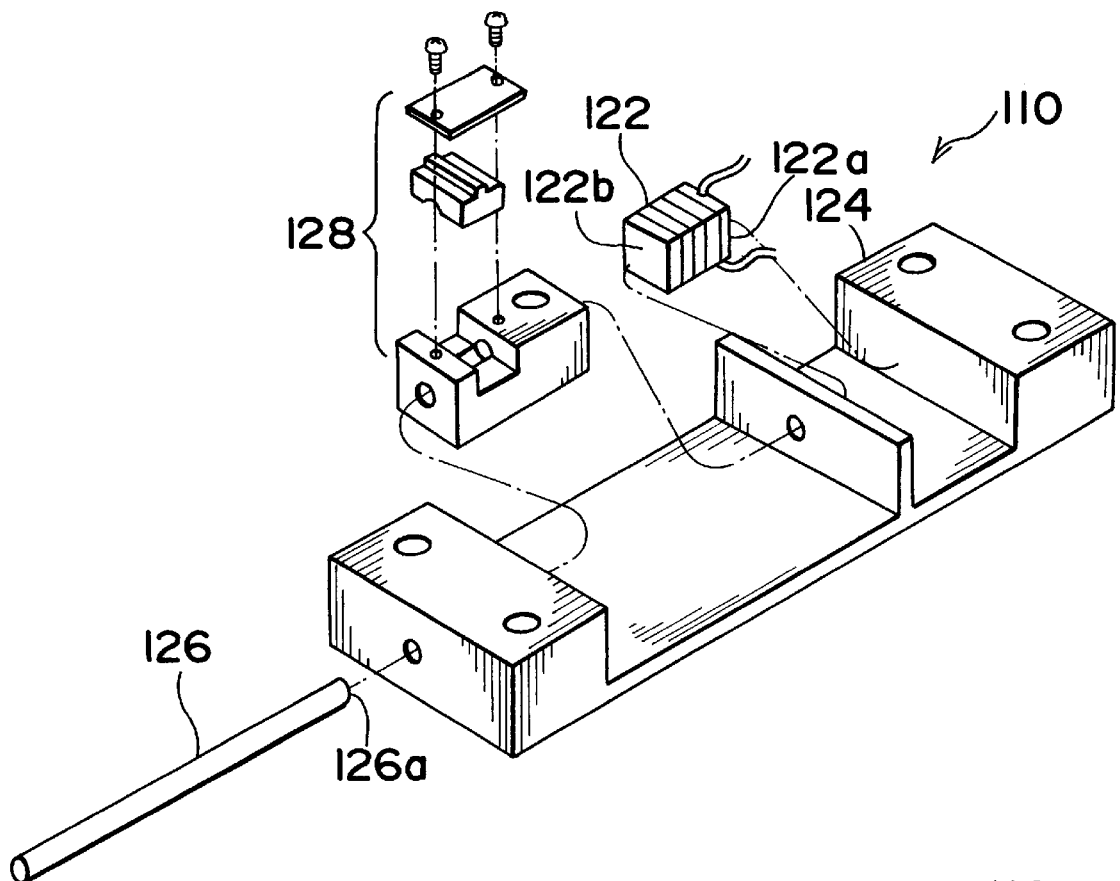
FIG. 1 is an exploded perspective view of a driving mechanism using a piezoelectric linear actuator according to a prior art.
Figure 2:
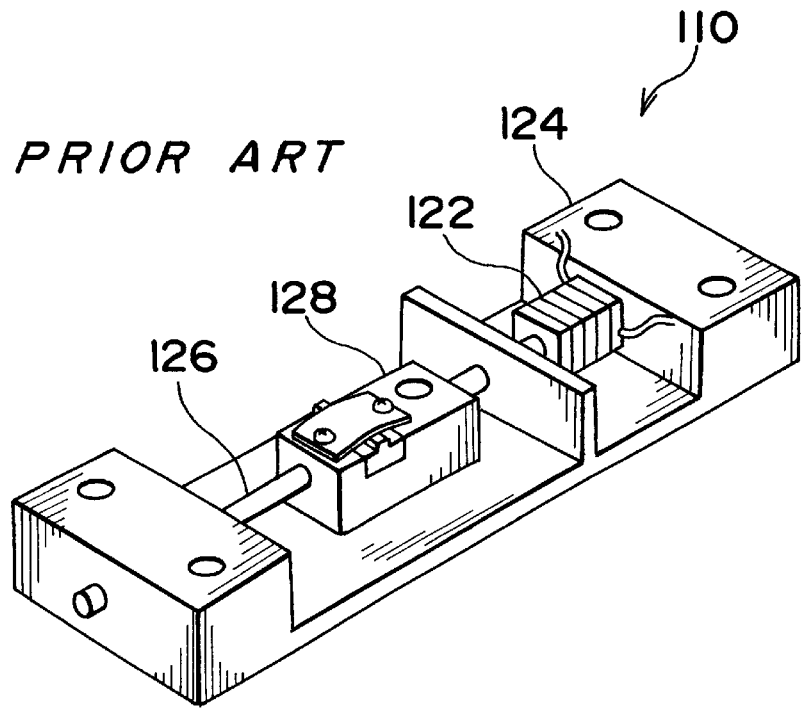
FIG. 2 is a perspective view of the driving mechanism assembled of FIG. 1.

Before the description of the present invention proceeds, it is to be noted that like or corresponding parts are designated by like reference numerals throughout the accompanying drawings.

Referring to FIGS. 4 through 21, a description is made below on a driving mechanism according to each of six embodiments of the present invention.

First, a first embodiment of the driving mechanism is described with reference to FIGS. 4 to 11 and FIG. 17.

Figure 10:
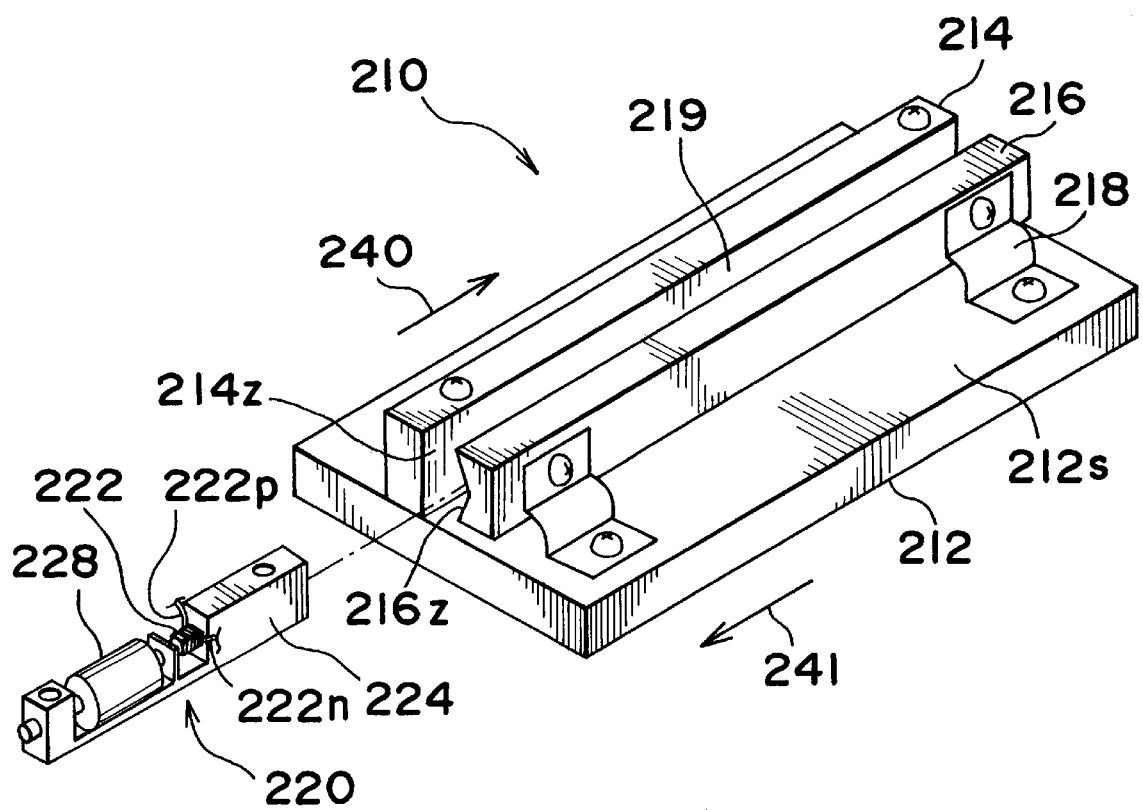
FIG. 10 is a perspective view of the driving mechanism according to the first embodiment of the present invention.
Figure 11:
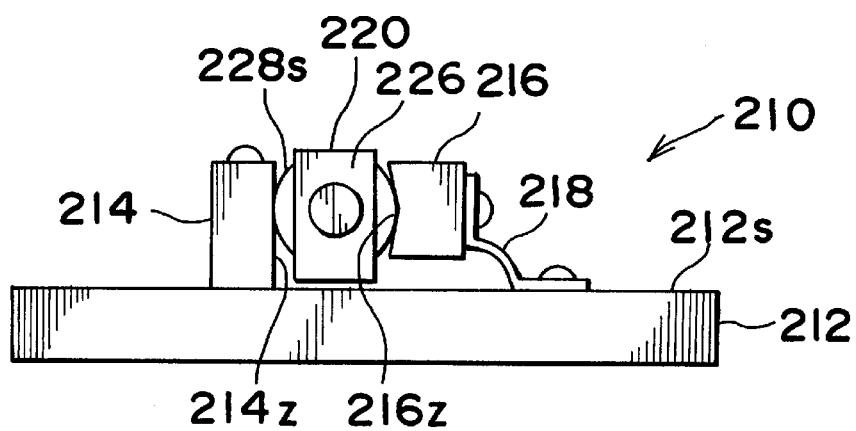
FIG. 11 is a front view of the driving mechanism of FIG. 10.

As shown in general perspective views of FIGS. 10 and 11, the driving mechanism 210 of the first embodiment is generally so constructed that a driving unit 220 is sandwiched above a base 212 by a pair of guide frictional members 214, 216.

The driving unit 220, as shown in FIGS. 5, 6, 7 8 and 9, comprises a piezoelectric element 222, a movable member 224, a guide member 226 and a driving shaft 228. The piezoelectric element 222 is a kind of electromechanical transduction element or electromechanical tranceducer, and is constituted by laminating a plurality of piezoelectric plates that change in volume when a voltage is applied thereto. The movable member 224 and the guide member 226 are made of stainless steel, and the driving shaft 228 is made of carbon fiber, which is a material low in density, high in rigidity and good in slidability. Therefore, the mass of the driving shaft 228 is smaller than that of the movable member 224 and the guide member 226.

The movable member 224 has a body 224a in a generally pillar shape, a first recessed portion 225a which is cut out from a side of a top face 224x thereof in its center, and a second recessed portion 225b which is cut out from the side of the top face 224x on a side of one end portion 224c. The guide member 226 is fixed to the one end portion 224c of the movable member 224. The other end portion 224d of the movable member 224, and the guide member 226 have, on their top faces 224x, 226x, screw holes 224t, 226t respectively for mounting an unshown member to be driven, such as a lens or stage, thereon.

The piezoelectric element 222 is accommodated in the first recessed portion 225a where one end face 222a in its laminating direction of the piezoelectric element 222 is adhesively fixed to a vertical face 224y, opposite to the second recessed portion 225b, of the first recessed portion 225a. On the other hand, the driving shaft 228 is accommodated in the second recessed portion 225b.

The driving shaft 228 comprises a cylindrical body 228a, and shaft portions 228b, 228c protrusively provided on both sides thereof along its center axis of the body 228a. On an intermediate wall portion 224b of the movable member 224 between the first recessed portion 225a and the second recessed portion 225b, and on the guide member 226, through holes 224s, 226s are respectively formed longitudinally. The shaft portions 228b, 228c of the driving shaft 228 are inserted therein respectively so that the driving shaft 228 is supported axially slidably thereby. A shaft-end face of one shaft portion 228b of the driving shaft 228 is adhesively fixed to the other end face 222b in its laminating direction of the piezoelectric element 222.

In the assembled driving unit 220, as shown in FIGS. 5 and 11, an outer circumferential surface 228s of the body 228a of the driving shaft 228 protrudes outward of both side faces 224z of the movable member 224 so that the body 228a is sandwiched between the pair of guide frictional members 214, 216 so as to be frictionally coupled therewith.

Referring to the pair of guide frictional members 214, 216, as shown in FIGS. 10 and 11, a first member 214 of the two, i.e. a stationary guide frictional member 214, is securely fixed to a top face 212s of the base 212; and a second member 216 thereof, i.e. a movable guide frictional member 216, is elastically supported by a support spring 218 along the first member 214 with a state in which the second member 216 floats above the base 212. A constant space 19 is formed between the first and second members 214, 216.

The support spring 218 has a higher rigidity in the longitudinal direction of the second member 216, i.e., in the moving direction of the driving unit 220, and has a small elasticity in a direction perpendicular to the moving direction thereof. The first and second members 214, 216 are opposed to each other, where a face 214z of the first member 214 opposed to the second member 216 is a planar face 214z and a face 216z of the second member 216 opposed to the first member 214 is a V-grooved face 216z having a V-shaped cross section extending along the planar face 214z of its opposing first member 214.

With the construction, the body 228a of the driving shaft 228 of the driving unit 220 engages the V-grooved face 216z of the second member, by which the driving shaft 228 is biased against the first member 214. That is, the driving unit 220 is placed in the space 219 which is formed between the two guide frictional members 214, 216, whereas the body 228a of the driving shaft 228 is sandwiched between the planar face 214z of one guide frictional member 214 and the V-grooved face 216z of the other guide frictional member 216 so as to be held floated above the base 212.

By the way, an unshown member to be driven is mounted on the top faces 224x, 226x of the movable member 224 and the guide member 226, respectively, as explained above. The member to be driven may be movably supported along the base 212 by any appropriate means.

The driving mechanism 210 constructed as described above allows the driving unit 220 to be moved along the guide frictional members 214, 216 when a voltage, for instance, in the saw-toothed wave form of the periodic pulse is applied to the piezoelectric element 222.

More specifically, if explaining the principle of how the driving mechanism is operated with reference to FIGS. 4A through 4D, when a voltage in the saw-toothed wave form of pulse, for example, is applied to the piezoelectric element 822, as shown in FIG. 4D, and when the pulse voltage rises slowly as indicated by a reference numeral 880a in the figure, the piezoelectric element 822 (222) slowly expands so that frictional member 828 (228a) and the guide frictional members 812 (214, 216) keep in mutual contact to each other without sliding. As a result, the movable member 824 (224) and the guide member 824 (226) is moved in the expanding direction of the piezoelectric element 822 (222) while the frictional member 828 (228) remains stationary relative to the guide frictional member 812 (214, 216), as shown in FIGS. 4A and 4B.

Next, when the pulse voltage rapidly falls down as indicated by a reference numeral 880b in FIG. 4D, the piezoelectric element 822 (222) rapidly contracts or shrinks, so that the movable member 824 (224) and the guide member 824 (226) substantially do not move relative to the guide frictional member 812 (214, 216) due to their inertia, causing a slide to occur between the frictional member 828

(228) and the guide frictional members 812 (214, 216), as shown in FIG. 4C. As a result, the frictional member 828 (228) moves in the contracting direction of the piezoelectric element 822 (222) relative to the guide frictional member 812 (214, 216).

Accordingly, the driving unit 220 intermittently moves along the guide frictional members 214, 216 in a direction from the driving shaft 228 toward the piezoelectric element 222 as indicated by an arrow 240 in FIG. 10.

Meanwhile, when the pulse voltage is reversely directed, i.e., when a pulse voltage composed of a rapid rise and a gentle fall is applied to the piezoelectric element 222, there first occurs a slide between the cylindrical body 228a of the driving shaft 228 and the guide frictional members 214, 216 because the piezoelectric element 222 expands rapidly. Then, there occurs no slide therebetween because the piezoelectric element 222 slowly contracts. As a result, the driving unit 220 moves in the opposite direction relative to the base 212, as indicated by an arrow 241 in FIG. 10.

By the way, as the frequency of the pulse voltage increases, the driving shaft 228 undergoes a transition into a normally sliding state. However, even in such a state, the driving unit 220 can be driven in a specified direction relative to the base 212 by a difference in product of force (force of dynamic friction×sliding time) for each direction. In more detail, if a sliding amount L1 in one direction is larger than a sliding amount L2 in the other direction opposite to the one direction, the driving unit 220 resultantly slides relative to the base 212 by an amount, corresponding to the difference (L1−L2) between the two sliding amounts L1 and L2, in the one direction.

The pulse voltage to be applied to the piezoelectric element 222, is not limited to the sawtooth-like wave form, and alternatively may be of other appropriate wave forms, such as a full-wave rectified wave form.

According to the construction of the driving mechanism 210, because the mass of the driving shaft 228 is far lighter than that of the movable member 224 and the guide member 226 as described above, the driving shaft 228 can be driven at high frequency. Also because the driving shaft 228 is made of a material having a good slidability, the driving speed becomes more stable.

Further, according to the construction of the driving mechanism 210, because the driving shaft 228 is guided by both the through hole 224s of the movable member 224 and the through hole 226s of the guide member 226 as shown in FIGS. 8 and 9, the driving shaft 228 is effectively prevented from rocking sideways at time of high-frequency drive. Accordingly, the driving mechanism 210 has the higher stability of speed than the stability of the driving mechanism 100, using the impact linear actuator, shown in FIGS. 3A to 3D, at higher frequencies.

In this construction, in case that the faces 214z, 216z of the guide frictional members 214, 216, with which the cylindrical body 228a of the driving shaft 228 engages, are coarser in surface roughness, the driving unit 220 undergoes a larger variation in driving speed.

Figure 17:
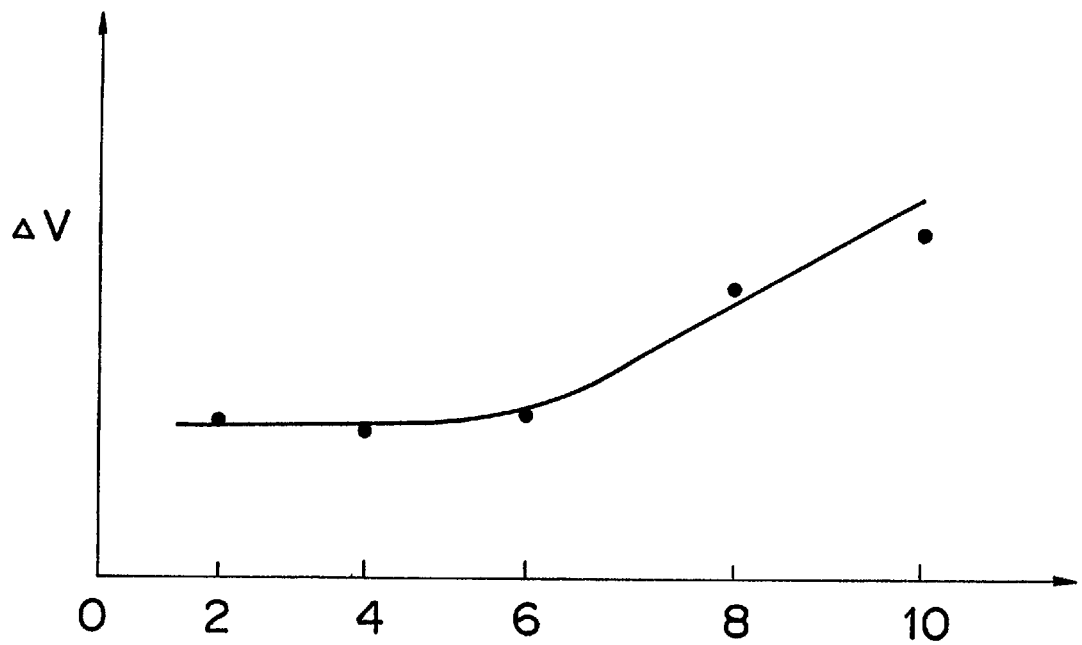
FIG. 17 is a graph showing a relationship between a surface roughness of a guide frictional member and a magnitude of variation in the driving speed.
Figure 18:
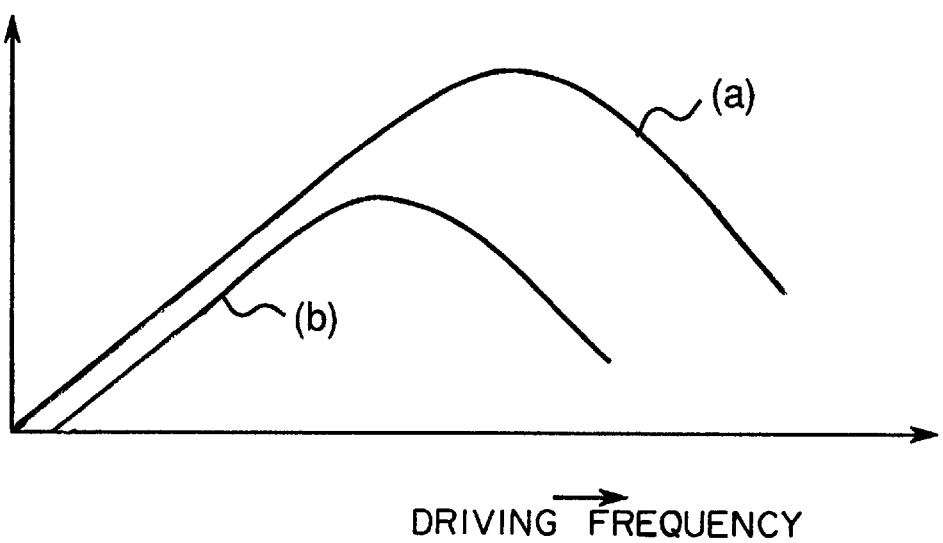
FIG. 18 is a graph showing an experimental result of relationship between a driving frequency and a driving speed.

FIG. 17 is a graph showing the relationship between the surface roughness of the guide frictional members 214, 216 and the variations in the driving speed of the driving unit 220. The horizontal axis of this graph represents the surface roughness of the contact faces 214z, 216z of the guide frictional members 214, 216 in arithmetic average roughness Ra, whereas the vertical axis represents a change ΔV (delta V) in the driving speed of the driving unit 220 in case that a pulse voltage of the same wave form is continuously applied to the piezoelectric element 222.

The graph shows that the change ΔV (delta V) in the driving speed is generally constant when the surface roughness of the contact faces 214z, 216z of the guide frictional members 214, 216 is smaller than 6 μm in arithmetic mean roughness Ra, and that the change ΔV (delta V) in the driving speed gets increasingly greater when the surface roughness thereof is larger than 6 μm.

Accordingly, the surface roughness of the contact faces 214z, 216z of the guide frictional members 214, 216 is preferably smaller than 6 μm in arithmetical mean surface roughness Ra.

In this driving mechanism 210, because the driving unit 220 moves along the guide frictional members 214, 216, it is possible to lengthen the guide frictional members 214, 216 and to realize a longer stroke. Even if the guide frictional members 214, 216 are lengthened, the driving unit 220 is driven in a similar way, so that the driving speed thereof never lowers.

Also in this driving mechanism 210, because the driving shaft 228 is supported so that no moment is exerted upon both the fixed coupling faces 222a, 222b of the piezoelectric element 222, the force generated by the piezoelectric element 222 is effectively used.

By the way, the driving mechanism 210 of the first embodiment has the construction in which the guide frictional members 214, 216 are stationary and the driving unit 220 is moved with respect to the guide frictional members 214, 216. With the construction, the driving unit 220 pulls a pair of lead wires 222n, 222p being connected to the piezoelectric element 222 when the driving unit 220 is driven. In order to solve this problem, the driving mechanism may be so constructed that the driving unit 220 is fixed on the base 212 thereof and the guide frictional members 214, 216 is slidable relative to the base 212 thereof. With the construction, it is possible to realize a driving mechanism having a long stroke in which the electrical wires 222n, 222p are not pulled by the driving unit when the driving unit is driven.

The driving mechanism of the first embodiment has a construction in which there generates a frictional force between the driving shaft 228 and the guide frictional members 214, 216, by making use of the support spring 218 which is an elastic member, as shown in FIGS. 10 and 11. Accordingly, the frictional force and/or the resistant force exerting between the driving shaft 228 and the guide frictional members 214, 216 change in case that the angle between the guide frictional members 214, 216 changes, thus changing the driving speed of the driving unit 220 relative to the base 212 depending on the position of the driving unit 220 relative thereto.

Next, a second embodiment of the driving mechanism is described below with reference to FIG. 12. The driving mechanism 310a of the second embodiment is so arranged as to suppress or prevent the change in driving speed of the driving unit relative to the base, depending on the position of the driving unit relative thereto. The following description will be mainly focused on differences from the first embodiment. By the way, parts similar or corresponding to those shown in the first embodiment are designated by reference numerals the two digit portions of which are the same as those used in the first embodiment.

Figure 12:
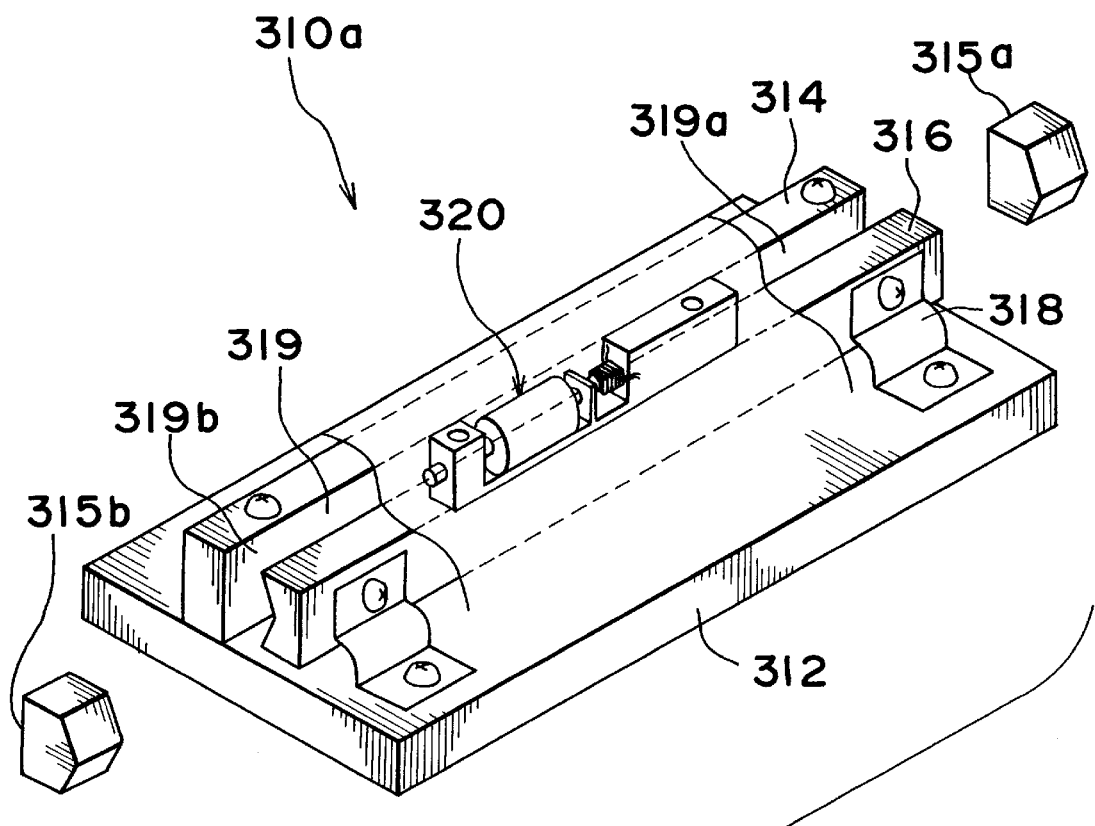
FIG. 12 is a perspective view of a driving mechanism according to a second embodiment of the present invention.

The driving mechanism 310a of the second embodiment is so arranged that a pair of spacing regulation members 315a, 315b are placed in a space 319 on predetermined end portions 319a, 319a between the pair of guide frictional members 314, 316, as shown in FIG. 12. With this arrangement, a change in the angle between the guide frictional members 314, 316 due to the position of the driving unit 320 relative to the guide frictional members 314, 316 is reduced. As a result, a generally uniform biasing force acts on the driving shaft of the driving unit 320, making it possible to suppress or prevent a change in the frictional force and/or the resistance force exerting between the driving shaft of the driving unit 320 and the guide frictional members 314, 316 at time of sliding motion.

Therefore, any change in the driving speed of the driving unit 320 relative to the base of the driving mechanism 310*a* is effectively prevented, in case that the driving unit 320 is changed in position with respect to the base thereof.

The first and second embodiments have a similar construction in which a frictional force is generated between the driving shaft 228 and the guide frictional members 214, 216; 314, 316 by the support spring 218, 318. Next, the third and fourth embodiments in which other arrangements are adopted for generation of the frictional force are described below.

Figure 13:
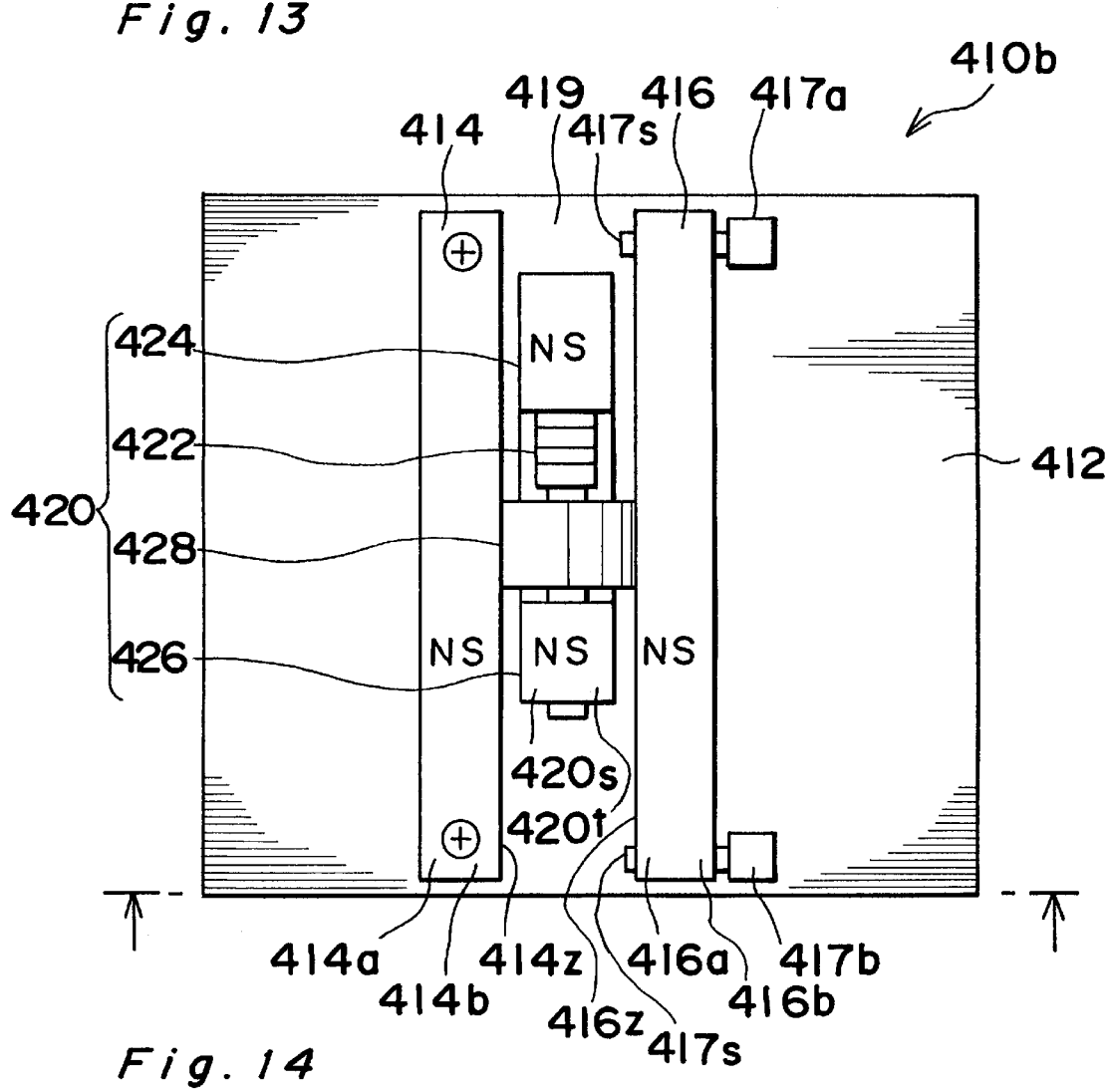
FIG. 13 is a plan view of a driving mechanism according to a third embodiment of the present invention.
Figure 14:
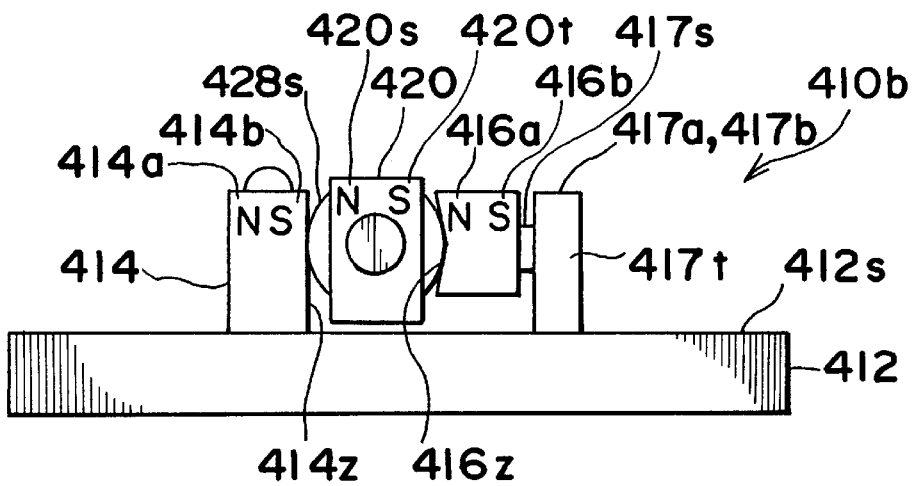
FIG. 14 is a front view of the driving mechanism of FIG. 13.

First, a description is made on a third embodiment of the driving mechanism with reference to FIGS. 13 and 14. By the way, parts similar or corresponding to those shown in the first embodiment are designated by reference numerals the two digit portions of which are the same as those used in the first embodiment.

The driving mechanism 410*b* of the third embodiment uses a magnetic force for generating a frictional force, as shown in the plan view of FIG. 13 and the sectional view of FIG. 14.

A pair of guide frictional members 414, 416 are disposed parallel to each other on a base 412. In more detail, one guide frictional member 414 is fixed directly to the base 412. On the other hand, the other guide frictional member 416 is held by support pins 417*s* of guide members 417*a*, 417*b* which are fixed to the base 412 in such a way that the guide frictional member 416 can be moved contactably with and separably from the one guide frictional member 414 while keeping parallel therewith.

The driving unit 420, which has a construction similar to the construction of the first embodiment, is placed in a space 419 between the two guide frictional members 414, 416. The driving shaft 428 is sandwiched between a planar face 414*z* of one guide frictional member 414 and a V-grooved face 417*z* of the other guide frictional member 416, by which the driving unit 420 is held in a state of floating above the base 412. In order to give a sandwiching force or pinching force with which the driving unit 420 is held by and between the pair of guide frictional members 414, 416, the guide frictional members 414, 416 as well as the movable member 424 and the guide member 426 of the driving unit 420 are all made of magnetizable material. Their N poles and S poles are alternately arranged in a direction perpendicular to the longitudinal direction so that they are attracted to each other, as shown in FIG. 13.

More specifically, in one guide frictional member 414, the S pole is arranged longitudinally at a portion 414*b* thereof on a side of the driving unit 420, while the N pole is arranged longitudinally at its opposite portion 414*a*. In the movable member 424 and guide member 426 of the driving unit 420, the N pole is arranged longitudinally at a portion 420*s* thereof on a side of the one guide frictional member 414, while the S pole is arranged longitudinally at a portion 420*t* thereof on a side of the other guide frictional member 416. In the other guide frictional member 416, the N pole is arranged longitudinally at a portion 416*a* thereof on a side of the driving unit 420, while the S pole is arranged longitudinally at its opposite portion 416*b*.

Accordingly, in the driving unit 420, its portion 420*s* thereof facing one guide frictional member 414 is attracted by the magnetic force toward the one guide frictional member 414, while its portion 420*t* thereof facing the other guide frictional member 416 is attracted by the magnetic force toward the other guide frictional member 416. Also, the two guide frictional members 414, 416 are attracted to each other by the magnetic force in a region of the space 19 between the guide frictional members 414, 416 where the driving unit 420 is not present interveniently.

By such a balance of attraction with the magnetic force exerting therebetween, the driving unit 420 is sandwiched between the two guide frictional members 414, 416 with a generally constant holding force therebetween.

That is, with the construction, a generally constant frictional force is generated between the driving shaft 428 of the driving unit 420 and the guide frictional members 414, 416, so that the change in the driving speed of the driving unit 420 relative to the base 412 thereof is reduced.

Figure 15:
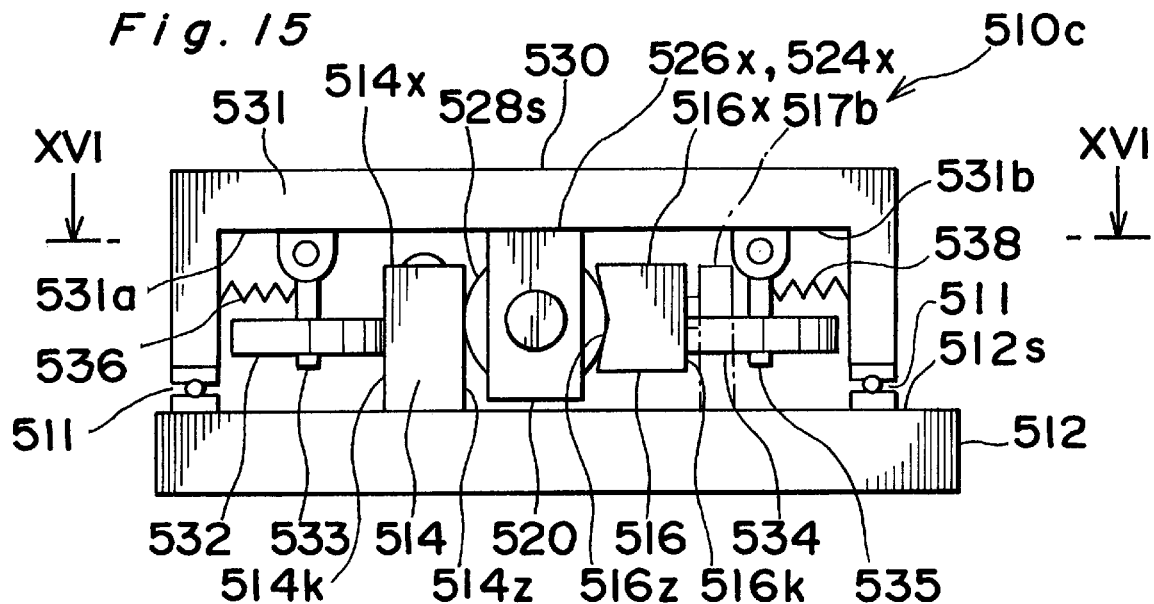
FIG. 15 is a partly broken front view of a driving mechanism according to a fourth embodiment of the present invention.
Figure 16:
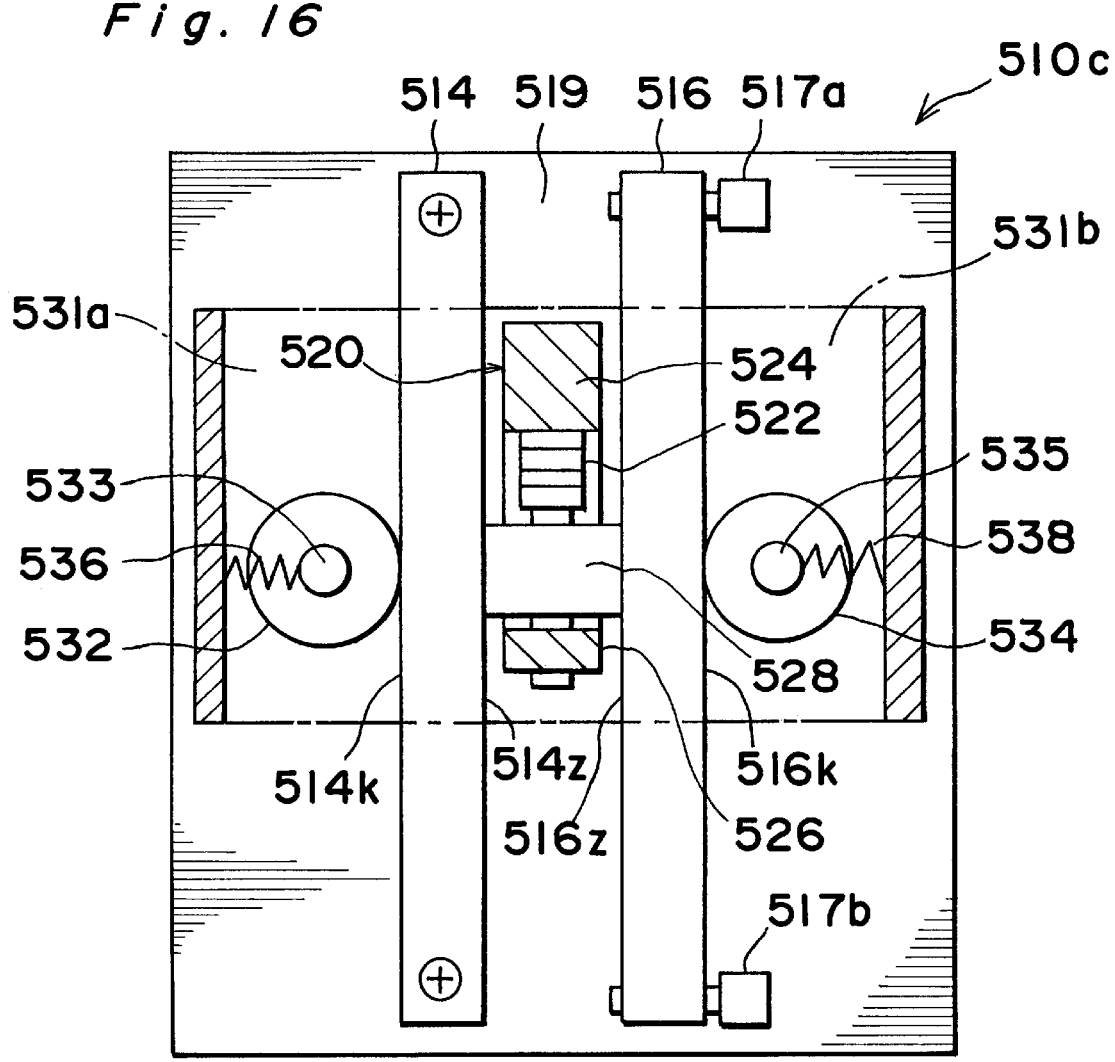
FIG. 16 is a partly broken plan view of the driving mechanism of FIG. 15.

Next, a description is made on a fourth embodiment of the driving mechanism with reference to FIGS. 15 and 16. By the way, parts similar or corresponding to those shown in the first embodiment are designated by reference numerals the two digit portions of which are the same as those used in the first embodiment.

The driving mechanism 510*c* of the fourth embodiment, as shown in a front view of FIG. 15 and a sectional view of FIG. 16, is constructed generally in the same way as in the third embodiment. The driving mechanism 510*c*, however, differs from that of the third embodiment in that the guide frictional members 514, 516, the movable member 524 of the driving unit 520, and the guide member 526 of the driving unit 520 are made of non-magnetic material, and in that a biasing mechanism 530 for biasing the guide frictional members 514, 516 is provided on top faces 524*x*, 526*x* of the driving unit 520.

The biasing mechanism 530 generally comprises a stage 531 fixed to the top faces 524*x*, 526*x* of the driving unit 520, and bias rollers 532, 534 rotatably supported by support shafts 533, 535 provided on rear faces 531*a*, 531*b* of the stage 531.

The stage 531 is fixed to the top faces 524*x*, 526*x* of the driving unit 520, extending on both sides beyond top faces 514*x*, 516*x* of the guide frictional members 514, 516. The stage 531 is supported at its both ends by ball bearings 511 so as to be movable along the top face 512*s* of the base 512. The support shafts 533, 535 are erected on these rear faces 531*a*, 531*b* of the stage 531 outer than the guide frictional members 514, 516, downward and generally vertically relative to the rear faces 531*a*, 531*b* so as to be able to rock more or less. The bias rollers 532, 534 are rotatably fitted to ends of the support shafts 533, 535, respectively. The support shafts 533, 535 are biased by bias springs 536, 538 toward the guide frictional members 514, 516, respectively.

As a result, the bias rollers 532, 534 bias outer surfaces 514*k*, 516*k* of the guide frictional members 514, 516 so that the guide frictional members 514, 516 approach to each other, thereby causing a friction to occur between the driving shaft 528 of the driving unit 520 and the guide frictional members 514, 516.

The bias rollers 532, 534 rotate while keeping contact with the outer surfaces 514*k*, 516*k* of the guide frictional members 514, 516 as the driving unit 520 moves, so that the friction between the bias rollers 532, 534 and the guide frictional members 514, 516 is suppressed low, thus allowing uninterrupted move of the driving unit 520.

In this driving mechanism 510c, the movable member 524 and guide member 526 of the driving unit 520 are in contact with the guide frictional members 514, 516 via the biasing mechanism 530. With the construction, the driving unit 520 and the stage 531 can be moved in small distances by reducing the frequency of the voltage to be applied to the piezoelectric element 522 and by using the displacement itself of the piezoelectric element 522.

That is, the frictional force between the driving shaft 528 of the driving unit 520 and the guide frictional members 514, 516 is larger than the frictional force between the bias rollers 532, 534 of the biasing unit 30 and the guide frictional members 514, 516. As a result, when the piezoelectric element 522 expands or contracts slowly, the driving shaft 528 of the driving unit 520 remains stationary relative to the guide frictional members 514, 516, so that a relative movement occurs between the guide frictional members 514, 516 and the bias rollers 532, 534 of the biasing unit 530. This means that expansion or contraction of the piezoelectric element 522 causes the driving unit 520 and the stage 531 to move by a distance equal to the expansion or contraction of the piezoelectric element 522 relative to the guide frictional members 514, 516. This is called a small movement in contrast to the coarse movement by a sawtooth-like pulse voltage.

By the way, in case that the frictional force between the driving shaft 528 of the driving unit 520 and the guide frictional members 514, 516 is smaller than the frictional force between the bias rollers 532, 534 and the guide frictional members 514, 516, even if the piezoelectric element 522 expands or contracts slowly, a slide occurs between the guide frictional members 514, 516 and the driving shaft 528 of the driving unit 520 so that the bias rollers 532, 534 of the biasing unit 530 remain stationary relative to the guide frictional members 514, 516. This means that the driving unit 520 and the biasing unit 530 do not move relative to the guide frictional members 514, 516 even if the piezoelectric element 522 expands or contracts. Accordingly, in this case, not only the small movement but also the coarse movement do not occur.

The driving mechanisms 310a, 410b, 510c of the second to fourth embodiments as described above have a long stroke and are capable of high-speed driving, like the driving mechanism 210 of the first embodiment.

Next, a fifth embodiment of the driving mechanism is described with reference to the exploded perspective view of FIG. 19 and the front view of FIG. 20. By the way, parts similar or corresponding to those shown in the first embodiment are designated by reference numerals the two digit portions of which are the same as those used in the first embodiment.

The driving mechanism 610 of the fifth embodiment is generally so constructed that a stage 630 is movably supported above a base 612 by linear bearings 614, that there is provided a driving mechanism including a driving unit 620, guide frictional members 616, 617 and the like between the base 612 and the stage 630, and that the stage 630 is driven by this driving mechanism.

More specifically, a pair of first members 614a of the pair of linear bearings 614 are fixed parallel to each other on a top face 612a of the base 612, and a pair of second members 614b of the pair of linear bearings 614 are fixed to a pair of fitting portions 630c in the rear face of a stage body 630a. The stage 630 is supported to the base 612 so as to be linearly movable.

The driving mechanism for driving the stage 630 relative to the base 612 is provided between the base 612 and the stage 630. That is, a driving unit 620 is fixed to a rear face 630s of the stage body 630a, and a pair of guide frictional members 616, 617 for sandwiching a driving shaft 627 of the driving unit 620 are provided on the top face 612a of the base 612. More specifically, a pair of guide frictional members 616, 617 are supported parallel to the pair of linear bearings 614 in a floating state within a space which is formed between the base 612 and the stage 630, by support springs 618 fixed to the top face 612a of the base 612. That is, a pair of guide frictional members 616, 617 are so arranged that their opposing planar faces 616z, 617z are extending parallel to the pair of linear bearings 14.

The driving unit 620 includes a piezoelectric element 622, a movable member 624 and a driving shaft 627. The piezoelectric element 622, which is a kind of electromechanical transduction element, is formed up by laminating a plurality of piezoelectric substrates. This is an element with a high responsivity which changes in length when a voltage is applied thereto.

The driving shaft 627 is a driving frictional member. The movable member 624 is made of stainless steel, and the driving shaft 627 is made of carbon fiber, which is a material low in density, high in rigidity and good in slidability. Therefore, the driving shaft 627 is smaller in mass than the movable member 624.

The movable member 624 has a generally pillar shape, having a first recessed portion 625a which is cut out from a side of a top face 620x in its center, and a second recessed portion 625b which is cut out from a side of the top face 620x on a side of one end portion 624c thereof. Screw holes 624s, 624t for fitting and mounting the stage 630 onto the movable member 624 by using screws 632, are bored at both end portions 624a, 624c of the movable member 624, respectively.

The piezoelectric element 622 is installed inside the first recessed portion 625a with a state that the expanding and contracting direction of the piezoelectric element 622 is coincident with the longitudinal direction of the movable member 624. One end face of the piezoelectric element 622 in its expanding and contracting direction is adhesively fixed to a vertical face 624k of the movable member 624 on one side opposite to the second recessed portion 625b.

The driving shaft 627 is accommodated in the second recessed portion 625b. The driving shaft 627 has a spherical body 627a, and a pair of shaft portions 627b, 627c protruding on both sides along the center axis of the body 627a. Through holes are formed longitudinally on both sides of the second recessed portion 625b, i.e., on an intermediate wall portion 624b and on one end portion 624c of the movable member 624. The shaft portions 627b, 627c of the driving shaft 627 are inserted into these holes, respectively, so that the driving shaft 627 is slidably supported thereby in the axial direction.

A shaft-end face of the one shaft portion 627b of the driving shaft 627 is adhesively fixed to the other end face of the piezoelectric element 622 in its expanding and contracting direction. The body 627a of the driving shaft 627 has a diameter larger than the width of the movable member 624. As a result, an outer circumferential surface 627s of the body 627a of the driving shaft 627 is protruded outward from both side faces 624z of the movable member 624.

Figure 20:
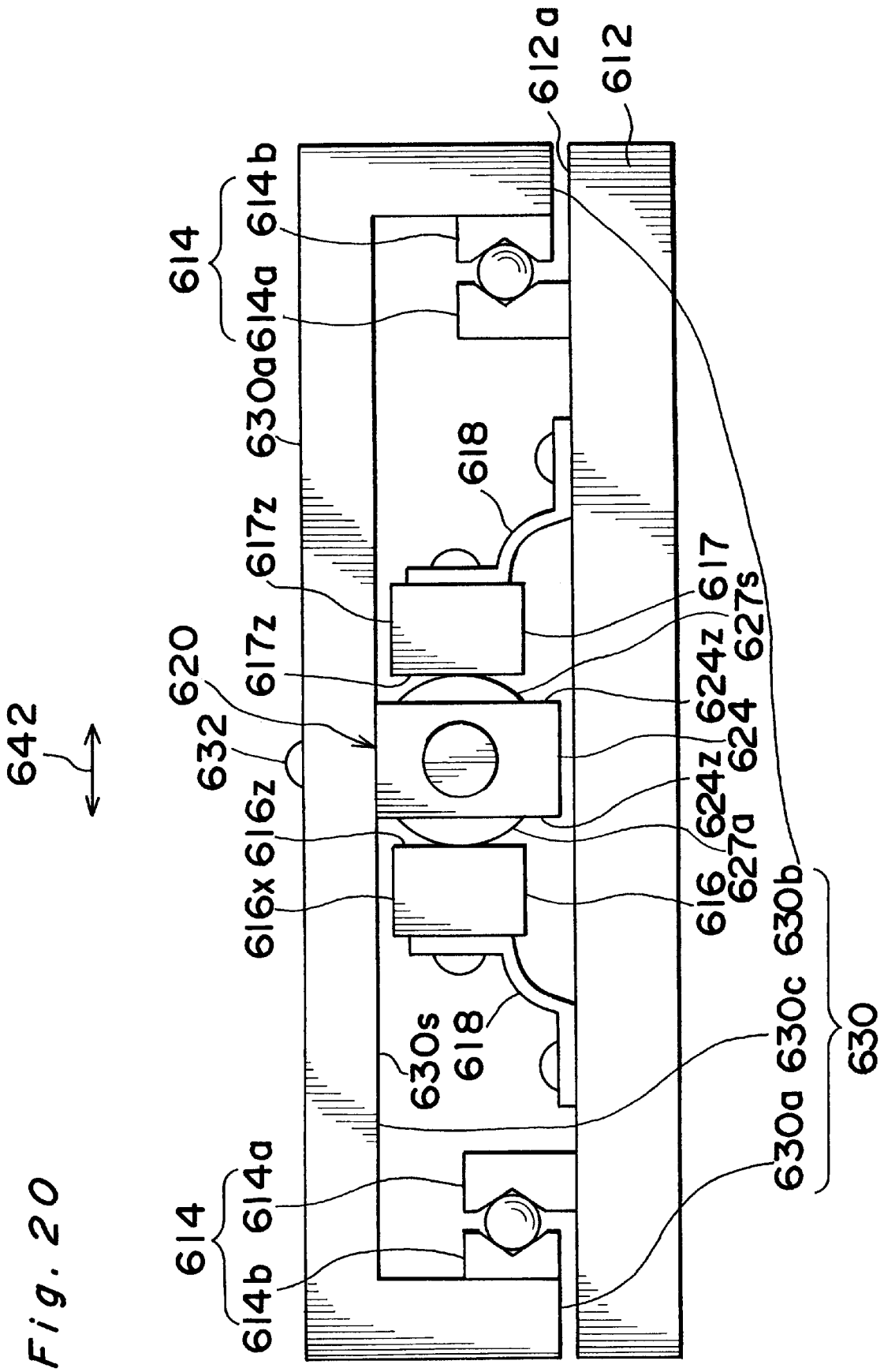
FIG. 20 is a front view of the driving mechanism assembled of FIG. 19.

In the driving unit 620, as shown in FIG. 20, the movable member 624 is fixed to a rear face 630s of the stage 630 with the screws 632, and is disposed between opposing planar faces 616z, 617z of the pair of guide frictional members 616, 617, so that the spherical body 627a of the driving shaft 627 is sandwiched between the guide frictional members 616, 617 so as to be frictionally coupled therewith. The sandwiching force or holding force thereby is given by the spring force of the support springs 618 that support the pair of guide frictional members 616, 617.

Each support spring 618 has a higher rigidity in the longitudinal direction of the guide frictional members 616, 617, i.e., in the moving direction of the driving unit 620 along the guide frictional members 616, 617, and a gentle or small elasticity in a direction perpendicular to the moving direction thereof.

The driving mechanism 610 constructed as described above operates so that the driving unit 620 is moved relative to the guide frictional members 616, 617 when a pulse voltage of some appropriate wave-like form is applied to the piezoelectric element 622, thereby moving the stage 630 relative to the base 612.

More specifically, for example, with a pulse voltage 80 of the saw-teethed wave form, as shown in FIG. 3D, applied to the piezoelectric element 622, when the pulse voltage 80 rises slowly as indicated by the reference numeral 80a, the piezoelectric element 622 slowly expands so that the driving shaft 627 of the driving unit 620 and the guide frictional members 616, 617 keep in contact to each other without sliding. Keeping this condition, the movable member 624 and the stage 630 are moved in the expanding direction of the piezoelectric element 622, i.e., in a direction indicated by an arrow 640 in FIG. 19.

Next, when the pulse voltage 80 rapidly falls as indicated by the reference numeral 80b, the piezoelectric element 622 rapidly contracts or shrinks so that the movable member 624 and the stage 630, far larger in mass than the mass of the driving shaft 627, remain stationary relative to the guide frictional members 616, 617 with the force of inertia of the movable member 624 and the stage 630. At this time, the driving shaft 627 with a smaller mass than the mass of the movable member 624 and the stage 630, slides relative to the guide frictional members 616, 617. As a result, the driving shaft 627 moves in the contracting direction of the piezoelectric element 622, i.e., in the direction indicated by the arrow 640 in FIG. 19.

By alternately repeating the above movement of the movable member 624, the stage 630 and the driving shaft 627 in the direction of the arrow 640, the driving unit 620 and the stage 630 are intermittently moved in the direction indicated by arrow the 640 in the figure, i.e., in such a direction as to be directed from the driving shaft 627 towards the piezoelectric element 622.

Figure 19:
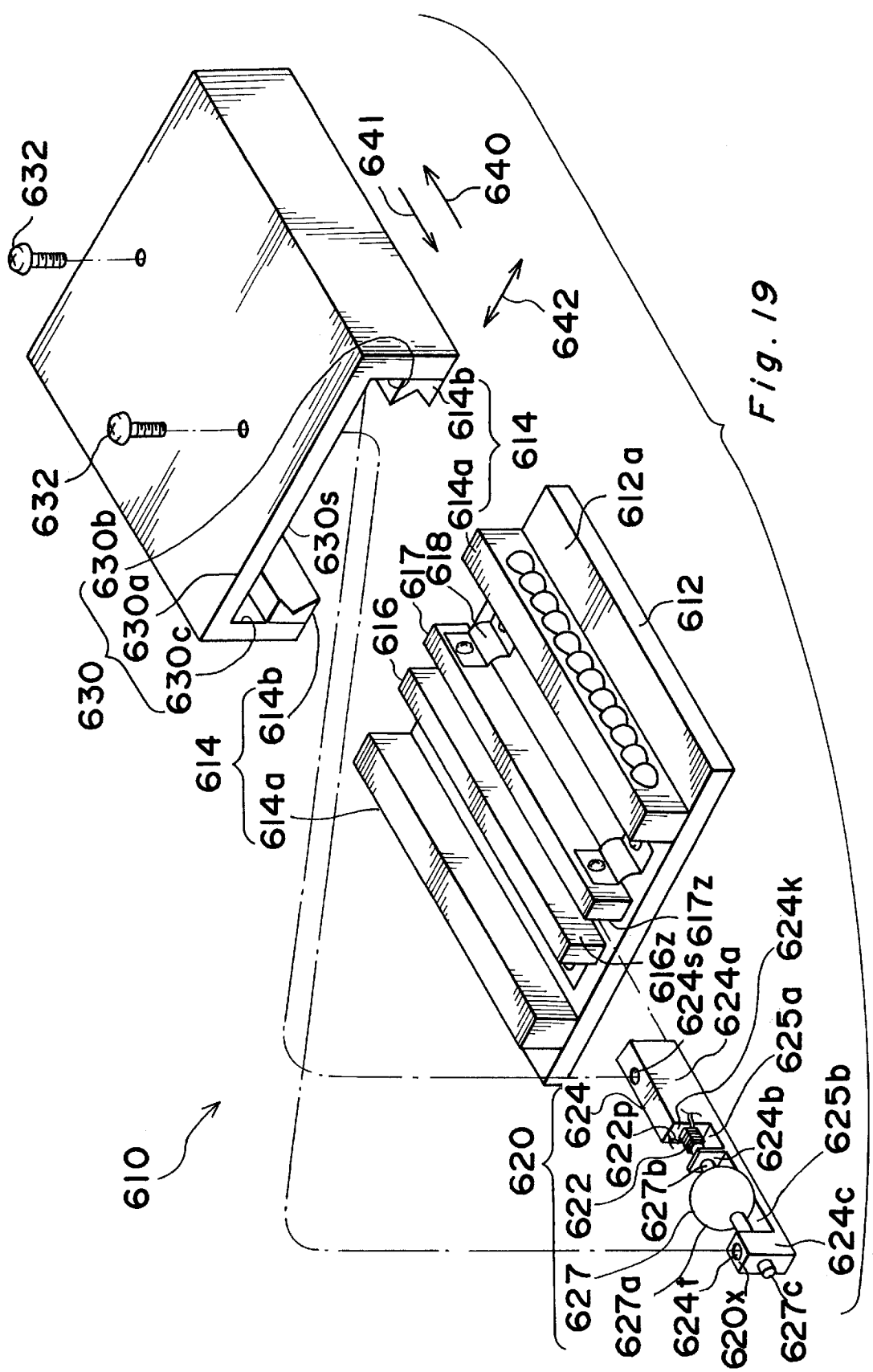
FIG. 19 is an exploded perspective view of a driving mechanism according to a fifth embodiment of the present invention.

Meanwhile, when a pulse voltage directed reverse to the foregoing, i.e., a pulse voltage having a wave-like form composed of a rapid rise and a gentle fall is applied to the piezoelectric element 622, the driving shaft 627 slides relative to the guide frictional members 616, 617 as the piezoelectric element 622 expands rapidly so that the driving shaft 627 moves in the direction indicated by the arrow 641 in FIG. 19. Then, the movable member 624 and the stage 630 move in the direction indicated by the arrow 641 in FIG. 19 as the piezoelectric element 622 slowly contracts. Accordingly, the driving unit 620 and the stage 630 can be intermittently moved in the direction indicated by the arrow 641 in FIG. 19, i.e., in such a direction as to be directed from the piezoelectric element 622 towards the driving shaft 627.

By the way, as the frequency of the pulse voltage increases, the driving shaft 627 undergoes a transition into a normally sliding state. However, even in such a state, the driving unit 620 can be driven in a specified direction relative to the base 612 by a difference in product of force (force of dynamic friction×sliding time) for each direction. In more detail, if a sliding amount L1 in one direction is larger than a sliding amount L2 in the other direction opposite to the one direction, the driving unit 620 resultantly slides relative to the base 612 by an amount, corresponding to the difference (L1−L2) between the two sliding amounts L1 and L2, in the one direction.

The pulse voltage to be applied to the piezoelectric element 622, is not limited to the sawtooth-like wave form, and alternatively may be of other appropriate wave forms, such as a full-wave rectified wave form.

As seen above, since the driving shaft 627 moves along the guide frictional members 616, 617 while it is frictionally coupled or engages with the guide frictional members 616, 617, the stroke of the driving mechanism 610 can be lengthened by lengthening the guide frictional members 616, 617. In this driving mechanism 610, even if the stroke is lengthened in this way, the stage 630 can be driven in the same manner by using the same driving unit 620. As a result, unlike the conventional driving mechanism using an impact actuator, there do not occur any adverse effects such as lowering of the driving speed.

Because the movable member 624 of the driving unit 620 is fixed to the stage 630 and the stage 630 is guided in its moving direction relative to the base 612 by the linear bearings 614, the driving shaft 627 moves in the guiding direction of the stage 630. The guide frictional members 616, 617 are supported by the support springs 618, and elastically movable in a direction perpendicular to the guiding direction of the stage 630, i.e., in a direction indicated by an arrow 642 in FIG. 19. Therefore, even if the opposing planar faces 616z, 617z of the guide frictional members 616, 617 with which the driving shaft 627 is frictionally engaged are shifted in direction from the guiding direction of the stage 630, the guide frictional members 616, 617 move so as to align with the position of the driving shaft 627, so that the driving shaft 627 and the guide frictional members 616, 617 maintain a constant frictional coupling state.

Accordingly, the driving mechanism 610 of the above constitution is long in stroke and capable of driving the stage 630 even with insufficient parallelism between the driving direction of the driving shaft 627 and the guiding direction of the stage 630.

Further, the spherical body 627a of the driving shaft 627 contacts two axisymmetrical points of the opposing planar faces 616z, 617z of the guide frictional members 616, 617. Therefore, even if the opposing planar faces 616z, 617z of the guide frictional members 616, 617 supported by the support springs 618 rotate within a plane perpendicular to driving directions 640, 641 of the driving unit 620, i.e., tilted left or right in FIG. 20, there occurs almost no force that pushes up or down the driving shaft 627. Namely, the driving shaft 627 does not undergo any harmful moment that possibly breaks the adhesion between the shaft portion 627b of the driving shaft 627 and the piezoelectric element 622, thus allowing the force generated by the piezoelectric element 622 to be effectively used.

Further, the driving shaft 627 is far smaller in mass than the movable member 624 and the stage 630, so that the driving shaft 627 becomes capable of being driven at high frequencies.

Also, the driving shaft 627 is made of a material having good slidability, so that the stability of the driving speed is high.

Furthermore, the driving shaft 627 is guided by the through holes provided at the intermediate wall 624b and the one end portion 624c of the movable member 624, so that the driving shaft 627 is less subject to rocking during the drive at any high frequency. This enhances the stability of speed during the drive thereat.

Figure 21:
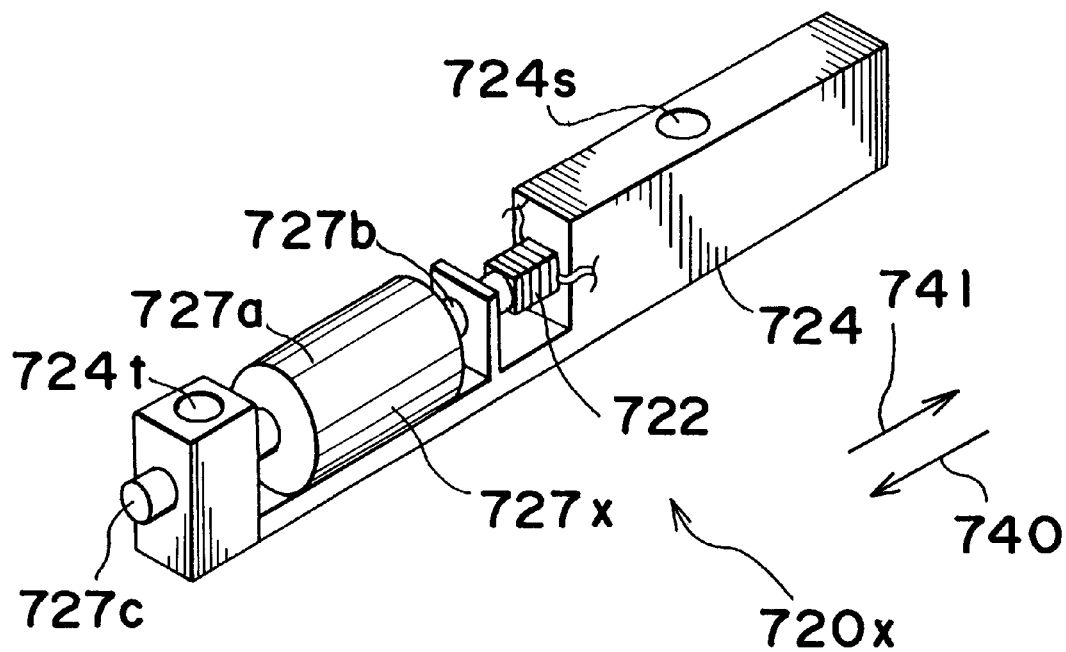
FIG. 21 is a perspective view of a driving unit of a driving mechanism according to a sixth embodiment of the present invention.

Next, a sixth embodiment of the driving mechanism in which a driving shaft 727X of a driving unit 720X thereof makes a line contact with respect to the guide frictional members (refer to the ones as shown in FIG. 19, for example) is described with reference to a perspective view of FIG. 21 which shows only the driving unit 720X thereof.

The sixth embodiment of the driving mechanism differs from the fifth embodiment thereof only in that a body portion 727a of the driving shaft 727X of the driving unit 720X is not spherical but cylindrical.

That is, the driving shaft 727X has shaft portions 727b, 727c on both sides along the cylindrical center axis of the body 727a. The body portion 727a of the driving shaft 727X makes the line contact with the guide frictional members as mentioned above so that the body portion 727a thereof frictionally engages therewith. In this case, even if the opposing planar faces (refer to the ones 616z, 617z as shown in FIGS. 19, 20, for example) of the guide frictional members supported by the support springs (refer to the ones 618 as shown in the same figures, for example) rotates within a plane perpendicular to the driving directions (refer to the ones 640, 641 as shown in the same figure, for example) of the driving unit 720X, there generates almost no force that pushes up or down the driving shaft 727X as in the fifth embodiment, so that the driving shaft 727X is driven stably at high speed.

As described above, the driving mechanism of the fifth and sixth embodiments realizes a long stroke thereof and a high-speed driving operation, even if the driving direction of the driving unit is not sufficiently parallel with respect to the guiding direction in which the member driven is guided.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A driving mechanism comprising:
   an electromechanical transducer which expands and contracts in a predetermined direction;
   a movable member which is connected to one of a pair of ends in the predetermined direction of the electromechanical transducer, wherein a member to be driven is fixed to the movable member;
   a frictional member which is connected to the other of the pair of ends in the predetermined direction;
   a base; and
   a guide which is provided on the base, wherein the guide frictionally engages the frictional member, and wherein the guide guides the frictional member in the predetermined direction.

2. The driving mechanism as claimed in claim 1, wherein the frictional member has a mass smaller than a mass of the movable member.

3. The driving mechanism as claimed in claim 1, wherein the guide comprises a first member and a second member, and wherein the frictional member is held between the first member and the second member.

4. The driving mechanism as claimed in claim 3, wherein the first member is fixed to the base, and wherein the second member is arranged along the first member.

5. The driving mechanism as claimed in claim 4, wherein the second member is movably supported relative to the first member with the second member being prevented from moving in the predetermined direction.

6. The driving mechanism as claimed in claim 5, wherein there is further provided a biasing device which biases the second member towards the first member.

7. The driving mechanism as claimed in claim 6, wherein the biasing device comprises a biasing member which contacts a surface, of the second member, opposite a surface with which the frictional member engages.

8. The driving mechanism as claimed in claim 7, wherein the biasing member is supported by the movable member, and wherein the biasing member biases the second member towards the first member at a location corresponding to the frictional member.

9. The driving mechanism as claimed in claim 8, wherein a frictional coefficient between the biasing member and the second member is smaller than a frictional coefficient between the frictional member and the second member.

10. The driving mechanism as claimed in claim 8, wherein the biasing member is constituted by a rotational member which rotatably contacts the second member.

11. The driving mechanism as claimed in claim 5, wherein there is further provided a spacer for regulating a space between the first member and the second member.

12. The driving mechanism as claimed in claim 5, wherein each of the first member and the second member is constituted by a magnetic body in which the first member and the second member attract each other.

13. The driving mechanism as claimed in claim 12, wherein there is further provided a spacer for regulating a space between the first member and the second member.

14. The driving mechanism as claimed in claim 1, wherein the frictional member is made of carbon fiber reinforced complex resin.

15. The driving mechanism as claimed in claim 1, wherein the movable member comprises a support part for movably supporting the frictional member in the predetermined direction.

16. The driving mechanism as claimed in claim 1, wherein the guide has a surface with which the frictional member engages, and wherein the surface has a roughness smaller than 6 µm in arithmetic mean.

17. The driving mechanism as claimed in claim 1, wherein there is further provided a circuit for generating a driving pulse to actuate the electromechanical transducer.

18. A driving mechanism, comprising:
   a drive unit which has an electromechanical transducer which expands and contracts in a first direction, a movable member which is connected to one of a pair of ends in the first direction of the electromechanical transducer, wherein a member to be driven is fixed to the movable member, and a frictional driver member which is connected to the other of the pair of ends in the first direction thereof;
   a base; and
   a frictional member which is provided on the base and frictionally engages the frictional drive member of the drive unit.

19. The driving mechanism as claimed in claim 18, wherein the frictional member does not move in the first direction.

20. The driving mechanism as claimed in claim 19, wherein the frictional member is supported by the base so as to limit a movement of the frictional drive member in a second direction generally perpendicular to the first direction.

21. The driving mechanism as claimed in claim 19, wherein the frictional member is supported by the base so that the frictional member is movable in a second direction generally perpendicular to the first direction.

22. The driving mechanism as claimed in claim 21, wherein the member to be driven includes a stage, the driving mechanism further comprising:

a guide member which is supported by the base and which guides the stage generally in the first direction.

23. The driving mechanism as claimed in claim 22, wherein the frictional drive member engages the frictional member with one of a state in which the frictional drive member contacts the frictional member with a point therebetween, and a state in which the frictional drive member contacts the frictional member with a line therebetween.

24. The driving mechanism as claimed in claim 22, wherein the frictional member comprises at least a pair of members each of which can be displaced generally in the second direction, and wherein the pair of members hold the frictional drive member so as to exert a frictional force between the frictional drive member and the member.

25. The driving mechanism as claimed in claim 24, wherein the frictional drive member of the drive unit comprises a spherical body and a pair of axial parts which project from both sides of the spherical body, wherein the movable member movably supports the pair of axial parts of the frictional drive member generally in the first direction, and wherein the frictional member comprises a surface with which the spherical body of the frictional drive member contacts.

\* \* \* \* \*